United States Patent
Kadar-Kallen et al.

(10) Patent No.: US 12,546,947 B2
(45) Date of Patent: Feb. 10, 2026

(54) AUTOMATIC SHUTTER ASSEMBLY FOR MULTI-FIBER CONNECTION SYSTEMS

(71) Applicant: CommScope Technologies LLC, Hickory, NC (US)

(72) Inventors: Josiah D. Kadar-Kallen, Harrisburg, PA (US); Robert Charles Flaig, Lancaster, PA (US)

(73) Assignee: COMMSCOPE TECHNOLOGIES LLC, Claremont, NC (US)

( * ) Notice: Subject to any disclaimer, the term of this patent is extended or adjusted under 35 U.S.C. 154(b) by 257 days.

(21) Appl. No.: 18/262,340

(22) PCT Filed: Jan. 20, 2022

(86) PCT No.: PCT/US2022/013122
§ 371 (c)(1),
(2) Date: Jul. 20, 2023

(87) PCT Pub. No.: WO2022/159577
PCT Pub. Date: Jul. 28, 2022

(65) Prior Publication Data
US 2024/0077682 A1 Mar. 7, 2024

Related U.S. Application Data

(60) Provisional application No. 63/140,541, filed on Jan. 22, 2021.

(51) Int. Cl.
*G02B 6/38* (2006.01)
*G02B 6/36* (2006.01)

(52) U.S. Cl.
CPC ........ *G02B 6/3809* (2013.01); *G02B 6/3636* (2013.01); *G02B 6/3644* (2013.01); *G02B 6/387* (2013.01); *G02B 6/3885* (2013.01)

(58) Field of Classification Search
None
See application file for complete search history.

(56) References Cited

U.S. PATENT DOCUMENTS 6,290,527 B1    9/2001   Takaya et al.
6,491,442 B1 *   12/2002   Murakami ............. G02B 6/389
                                                      385/59

(Continued)

FOREIGN PATENT DOCUMENTS

WO    2013/117598 A1    8/2013
WO    2016/100384 A1    6/2016

(Continued)

OTHER PUBLICATIONS

International Search Report and Written Opinion for Application No. PCT/US2022/013122 mailed May 4, 2022.

*Primary Examiner* — Chad H Smith
(74) *Attorney, Agent, or Firm* — Merchant & Gould P.C.

(57) ABSTRACT

The present disclosure relates generally to a bare fiber connection system that includes first and second multi-fiber fiber optic connectors that have a retractable shroud with a pivotal locking member mounted thereon. The pivotal locking member can be configured to lock the retractable shroud in an extended position. The pivotal locking member can be pivoted about a pivot point while remaining attached to the retractable shroud to unlock the retractable shroud such that the retractable shroud can move to a retracted position.

20 Claims, 23 Drawing Sheets

(56) References Cited

U.S. PATENT DOCUMENTS

| | | |
|---|---|---|
| 9,575,272 B2 | 2/2017 | Ott |
| 2015/0293311 A1 | 10/2015 | Coffey et al. |
| 2018/0329155 A1* | 11/2018 | Verheyden ............ G02B 6/3809 |
| 2020/0310038 A1 | 10/2020 | Verheyden et al. |

FOREIGN PATENT DOCUMENTS

| | | |
|---|---|---|
| WO | 2017/081306 A1 | 5/2017 |
| WO | 2017/223072 A1 | 12/2017 |
| WO | 2020/046709 A1 | 3/2020 |
| WO | 2021/163063 A1 | 8/2021 |
| WO | 2022/046780 A1 | 3/2022 |
| WO | 2022/046784 A1 | 3/2022 |

\* cited by examiner

FIG. 11
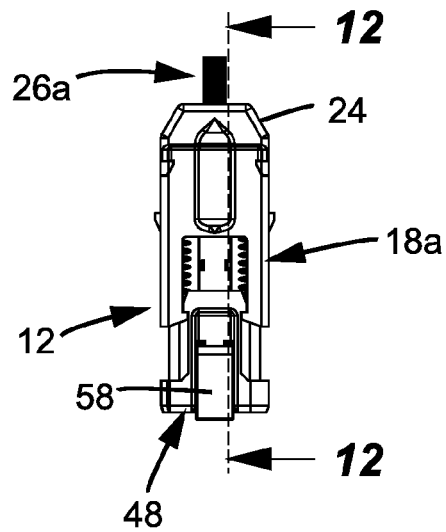
FIG. 12
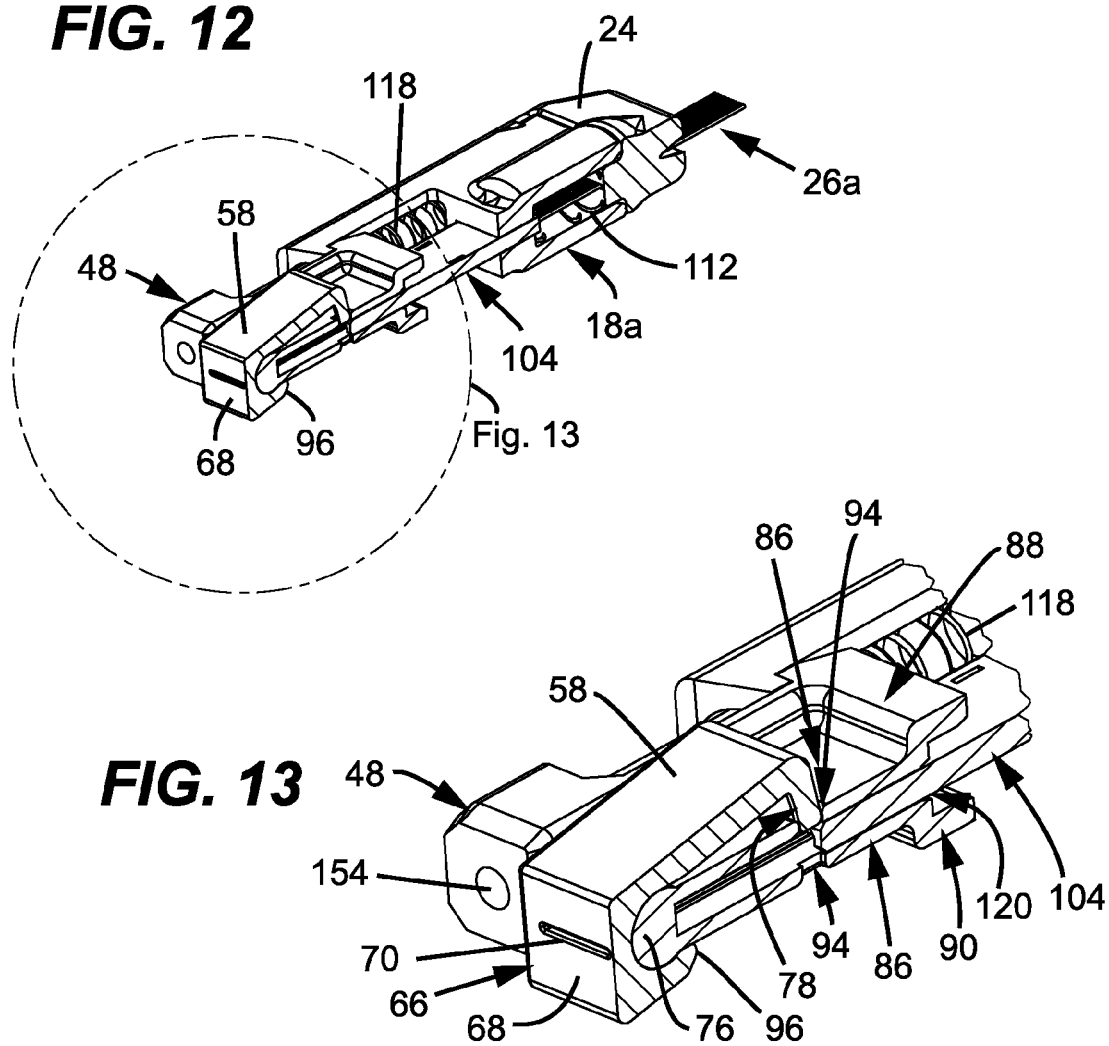
FIG. 13

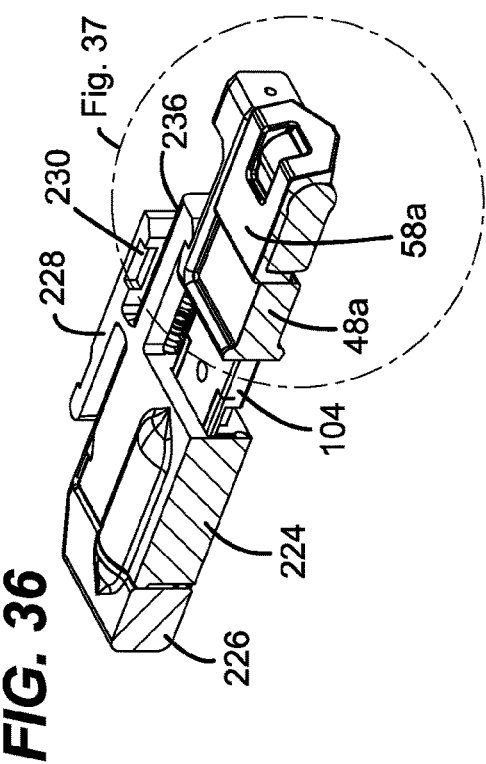
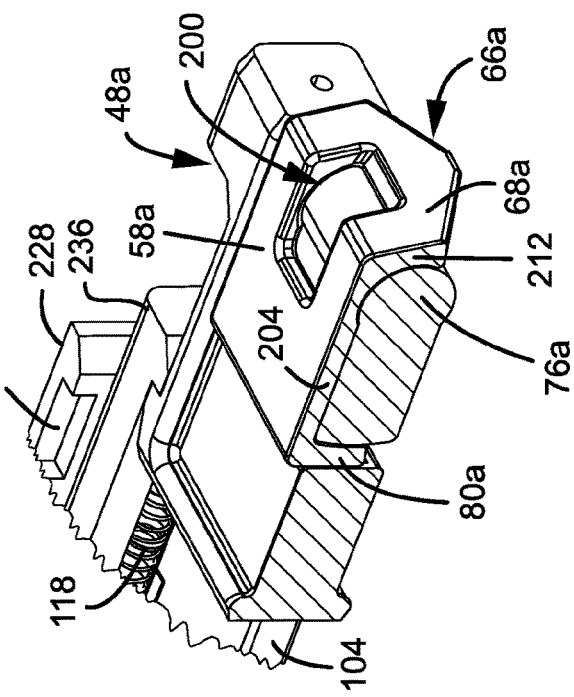
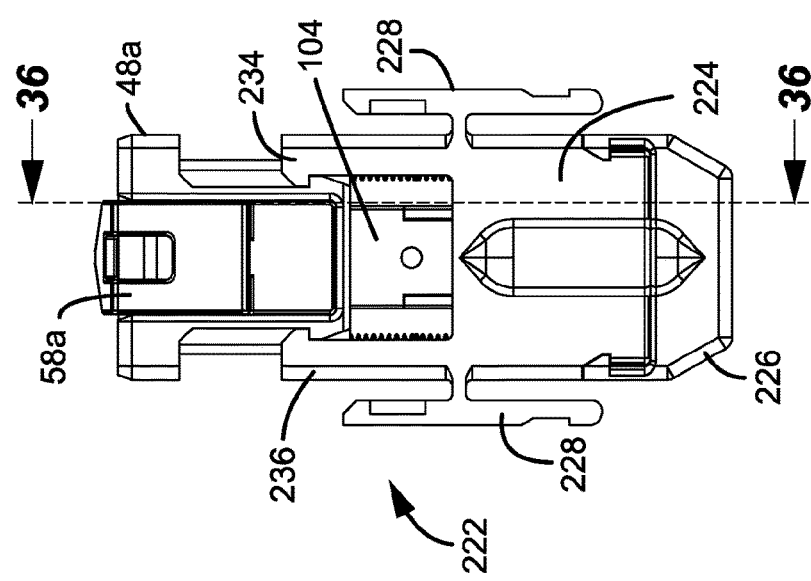

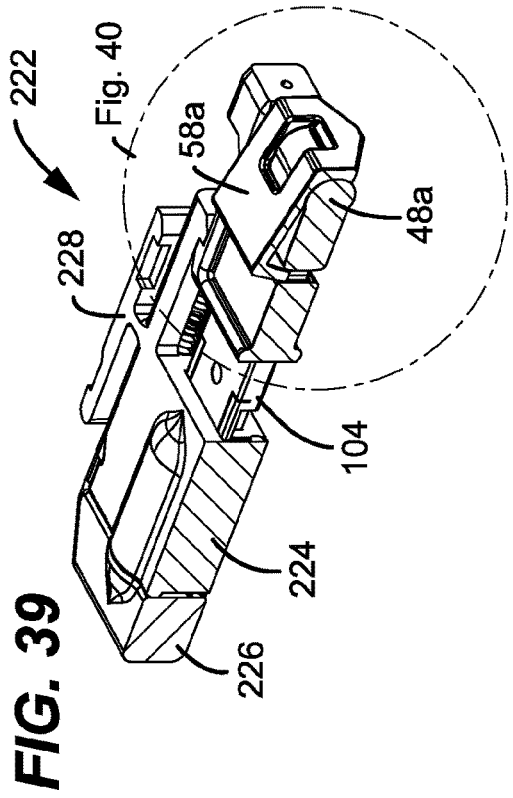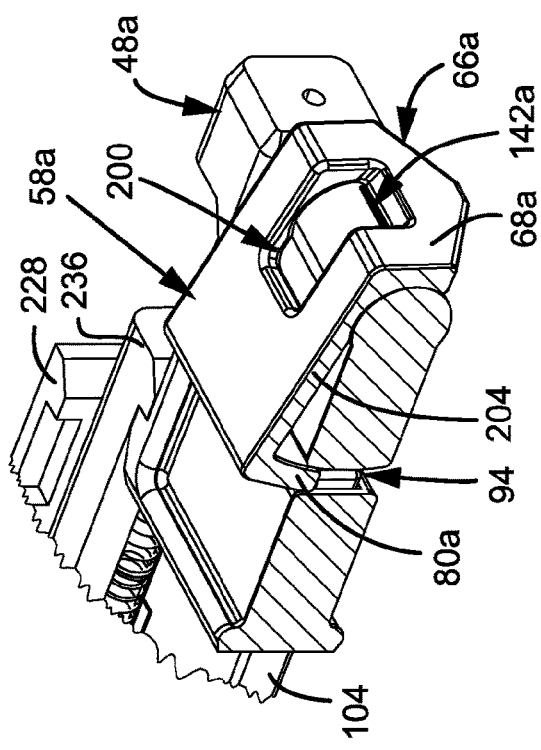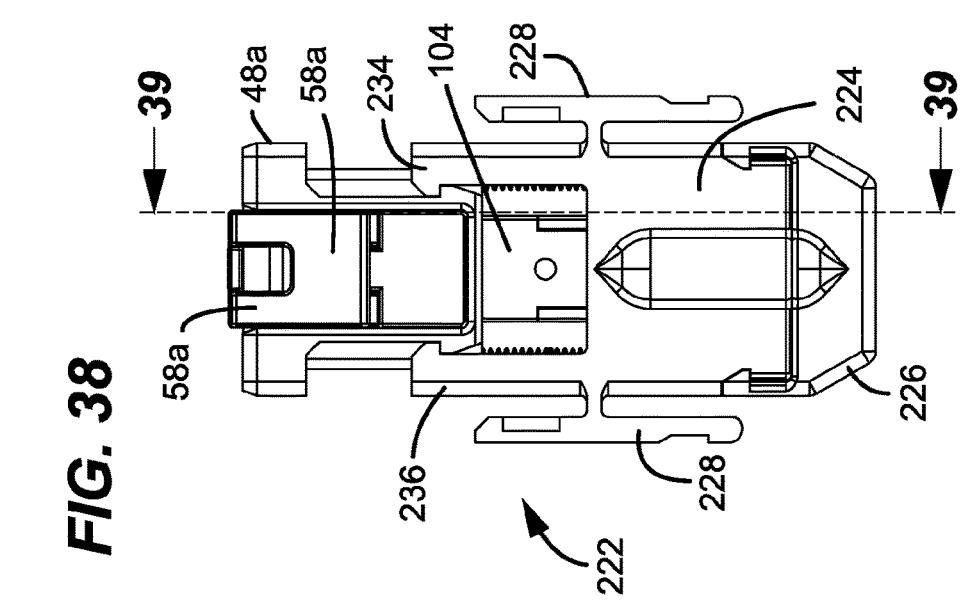

AUTOMATIC SHUTTER ASSEMBLY FOR MULTI-FIBER CONNECTION SYSTEMS

CROSS-REFERENCE TO RELATED APPLICATION

This application a National Stage Application of PCT/US2022/013122, filed on Jan. 20, 2022, which claims the benefit of U.S. Patent Application Ser. No. 63/140,541, filed on Jan. 22, 2021, the disclosures of which are incorporated herein by reference in their entireties. To the extent appropriate, a claim of priority is made to each of the above disclosed applications.

TECHNICAL FIELD

The present disclosure relates generally to multi-fiber connectivity. More particularly, the present disclosure relates to multi-fiber connection systems and bare-fiber connectors.

BACKGROUND

Fiber optic connectors are commonly used in optical fiber communication systems to effect demateable optical connections between waveguides such as optical fibers. A typical optical connection is made by co-axially aligning two optical fibers in end-to-end relation with end faces of the optical fibers opposing one another. To effect optical coupling and minimize Fresnel loss, it is typically preferred for "physical contact" to exist between the optical waveguides, which, in the case of optical connectors, is generally between the opposed end faces of the aligned optical fibers.

Traditionally optical connectors have employed "ferrules." Ferrules are well-known components, which each hold one or more optical fibers such that the end faces of the optical fibers are presented for optical coupling. For example, traditional single fiber optical connectors such as SC or LC connectors include cylindrical ferrules with optical fibers supported and precisely centered within the ferrules. A traditional multi-fiber optical connector such as an MPO connector can include a ferrule that supports a plurality of optical fibers in a row. In the case of MPO connectors, the ferrules of two fiber optic connectors desired to be coupled together have a mating male and female configuration (e.g., a pin and socket configuration) which aligns the ferrules and concurrently aligns the plurality of optical fibers supported by the ferrules.

Another type of fiber optic connector can be referred to as a ferrule-less fiber optic connector or bare fiber connector. In a bare fiber optic connector, an end portion of an optical fiber corresponding to the bare fiber optic connector is not supported by a ferrule. Instead, the end portion of the optical fiber is a free end portion. Similar to the ferruled connectors described above, fiber optic adapters can be used to assist in optically coupling together two bare fiber optic connectors. Fiber optical adapters for bare fiber connectors can include internal fiber alignment devices configured to receive optical fibers of bare fiber optic connectors desired to be optically coupled together and to align the fiber tips of the bare fiber optic connectors to enable the transfer of optical signals there between.

SUMMARY

The present disclosure relates generally to a bare fiber connection system that includes a pivotal locking member for use with bare fiber multi-fiber fiber optic connectors. The pivotal locking member is adapted to mount to a retractable shroud of the bare fiber connection system. The pivotal locking member includes features that function to lock the retractable shroud in an extended position to prevent the retractable shroud from sliding relative to a connector body of the bare fiber multi-fiber fiber optic connector. The pivotal locking member can also function as a dust cap to protect optical fibers in the retractable shroud of the bare fiber multi-fiber fiber optic connector.

The pivotal locking member can be pivoted about a pivot point between a closed position and an open position. In the closed position, the pivotal locking member locks the retractable shroud in the extend position and the optical fibers of the bare fiber multi-fiber fiber optic connector are protected within the retractable shroud. In the open position, the pivotal locking member can unlock the retractable shroud such that the retractable shroud can slide relative to the connector body to a retracted position without detaching or removing the pivotal locking member from the retractable shroud. When the pivotal locking member is in the open position, the optical fibers can extend through fiber passages defined in the retractable shroud and through an opening defined in the pivotal locking member.

The bare fiber connection system may also include a multi-fiber adapter that defines a mating adapter port for receiving the bare fiber multi-fiber fiber optic connector. When the bare fiber multi-fiber fiber optic connectors are inserted into the mating adapter port of the multi-fiber adapter, the pivotal locking members can engage a shoulder within the multi-fiber adapter that causes the pivotal locking members to automatically pivot from the closed position to the open position. When the bare fiber multi-fiber fiber optic connectors are unmated from the multi-fiber adapter, a feature defined in the multi-fiber adapter can function to act on the pivotal locking members to pivot the pivotal locking members back to the closed position.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The following drawings are illustrative of particular embodiments of the present disclosure and therefore do not limit the scope of the present disclosure. Embodiments of the present disclosure will hereinafter be described in conjunction with the appended drawings, wherein like numerals denote like elements.

FIG. 11 illustrates a top view of the first multi-fiber fiber optic connector.

FIG. 12 illustrates a cross-sectional perspective view take along line 12-12 of FIG. 11.

FIG. 13 illustrates an enlarged perspective view of a portion of the first multi-fiber fiber optic connector of FIG. 12.

FIG. 35 illustrates a top view of the fiber optic connector of FIG. 32 with the pivotal locking member in a closed position.

FIG. 36 illustrates a cross-sectional perspective view taken along line 36-36 of FIG. 35.

FIG. 37 illustrates an enlarged perspective view of a portion of the fiber optic connector of FIG. 36.

FIG. 38 illustrates a top view of the fiber optic connector of FIG. 32 with the pivotal locking member in an open position.

FIG. 39 illustrates a cross-sectional perspective view taken along line 39-39 of FIG. 38.

FIG. 40 illustrates an enlarged perspective view of a portion of the fiber optic connector of FIG. 39.

DETAILED DESCRIPTION

Figure 1:
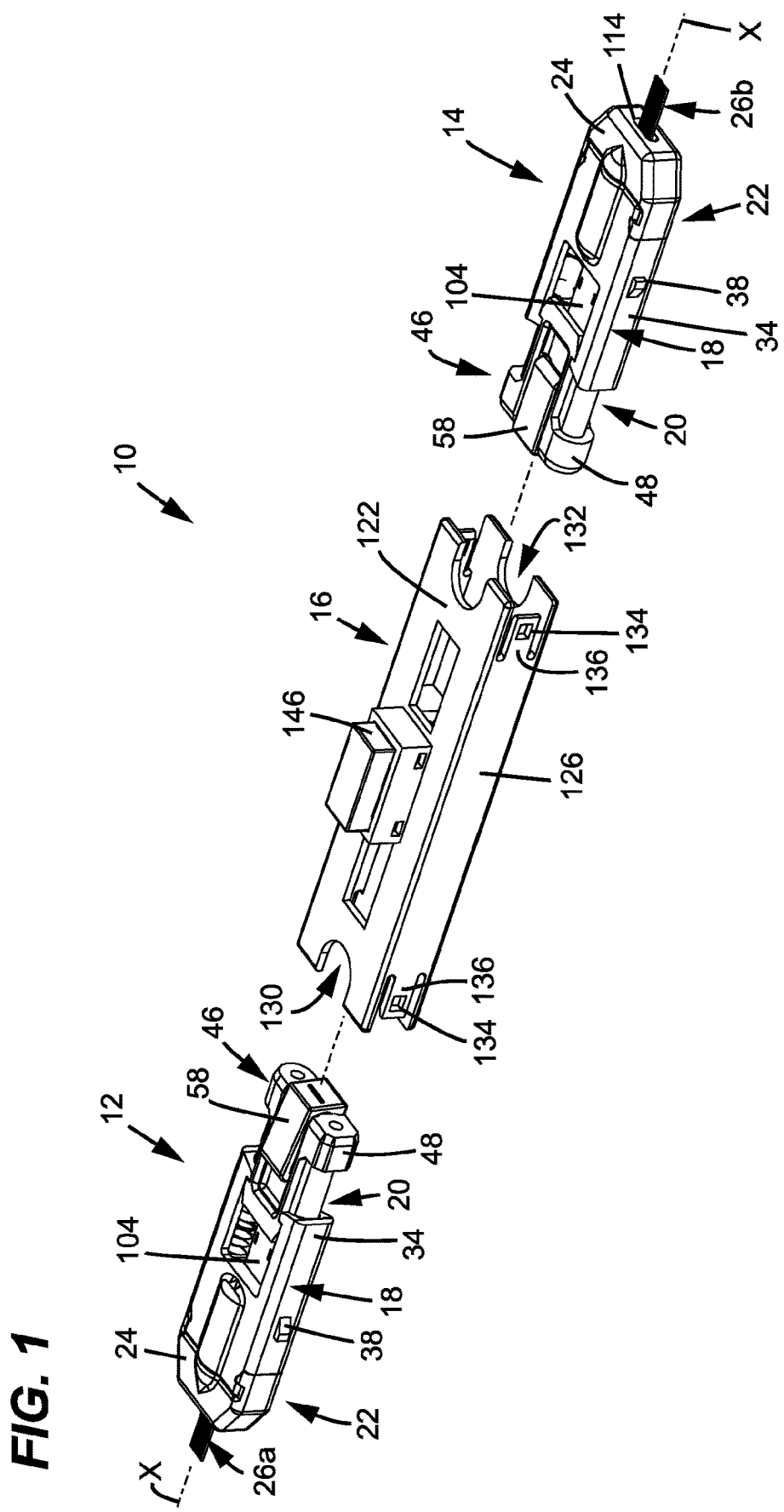
FIG. 1 illustrates a perspective view of a bare fiber connection system including first and second multi-fiber fiber optic connectors exploded from a multi-fiber adapter, each of the first and second multi-fiber fiber optic connectors having a plurality of optical fibers in accordance with principles of the present disclosure.

Various embodiments of the present invention will be described in detail with reference to the drawings, wherein like reference numerals represent like parts and assemblies throughout the several views. Reference to various embodiments does not limit the scope of the invention. Additionally, any examples set forth in this specification are not intended to be limiting and merely set forth some of the many possible embodiments.

The present disclosure relates generally to a bare fiber connection system that includes first and second multi-fiber fiber optic connectors that have a retractable shroud with a pivotal locking member mounted thereon. The pivotal locking member can be configured to lock the retractable shroud in an extended position. The pivotal locking member can be pivoted about a pivot point while remaining attached to the retractable shroud to unlock the retractable shroud such that the retractable shroud can move to a retracted position.

FIG. 1 illustrates an example bare fiber connection system 10 in accordance with the principles of the present disclosure. The bare fiber connection system 10 includes a first multi-fiber fiber optic connector 12, a second multi-fiber fiber optic connector 14, and a multi-fiber adapter 16. In the depicted example, the first and second multi-fiber fiber optic connectors 12, 14 are bare fiber multi-fiber fiber optic connectors.

The first and second multi-fiber fiber optic connectors 12, 14 each include a connector body 18a, 18b that has a front end 20 and a rear end 22. The connector bodies 18a, 18b each defines a longitudinal axis X that extends through the connector bodies 18a, 18b in an orientation that extends from the front end 20 to the rear end 22 of the connector bodies 18a, 18b.

In certain examples, the connector body 18 can include two pieces. For example, a rear piece connector body 24 can be mounted to the connector body 18 by a snap-fit connection, although alternatives are possible.

The first multi-fiber fiber optic connector 12 includes a first plurality of optical fibers 26a that extend through the connector body 18a from the rear end 22 to the front end 20. The second multi-fiber fiber optic connector 14 includes a second plurality of optical fibers 26b that extend through the connector body 18b from the rear end 22 to the front end 20. The first and second plurality of optical fibers 26a, 26b have fiber ends 28 (e.g., free end portions, bare fiber portions)(see FIG. 3) that are respectively accessible at the front ends 20 of the connector bodies 18a, 18b of the first and second multi-fiber fiber optic connectors 12, 14. In certain examples, the first and second plurality of optical fibers 26a, 26b may be ribbonized, buffered, or otherwise contained within a passage of an outer jacket. In the example shown, there are twelve optical fibers 26. In certain examples, however, the first and second multi-fiber fiber optic connectors 12, 14 may include a greater or lesser number of optical fibers 26 (e.g., one fiber, two fibers, six fibers, eight fibers, twenty-four fibers, etc.).

The first and second multi-fiber optic connectors 12, 14 are identical. As such, only the first multi-fiber fiber optic connector 12 will be described in detail. It will be appreciated that the features described herein with reference to the first multi-fiber fiber optic connector 12 will also apply to the second multi-fiber fiber optic connector 14.

Figure 2:
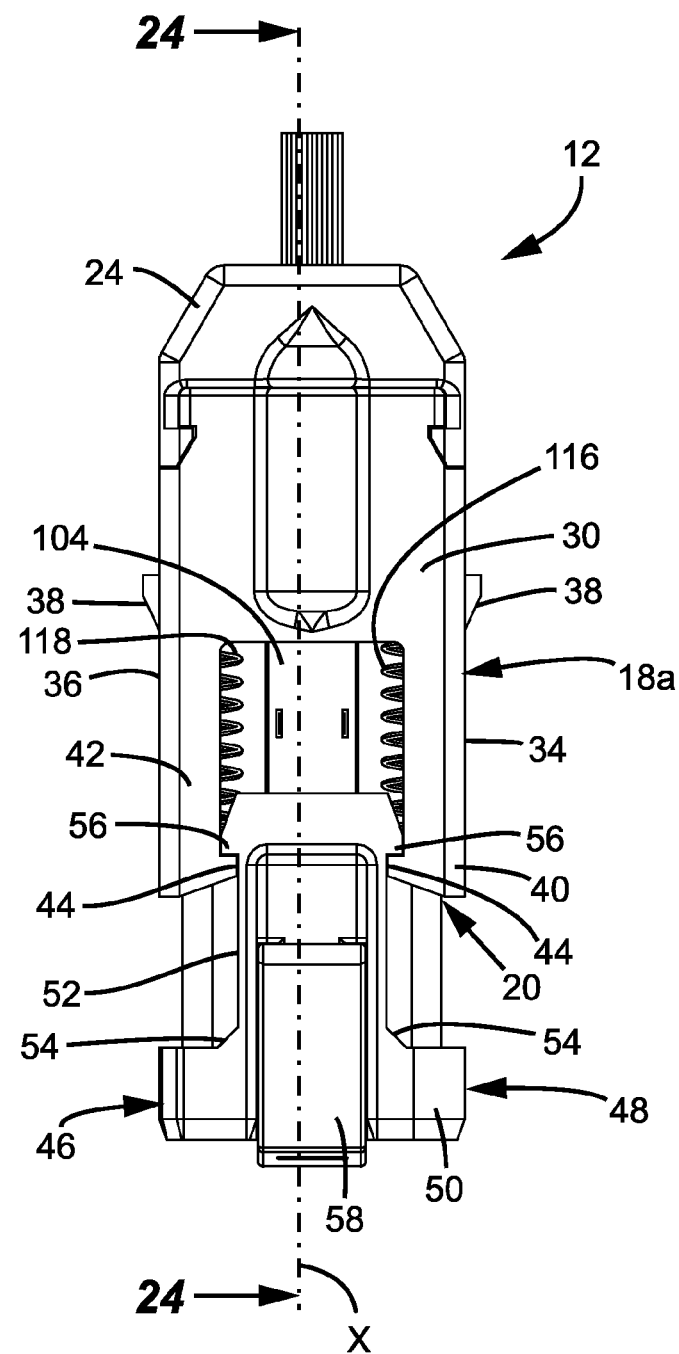
FIG. 2 illustrates a top view of the first multi-fiber fiber optic connector of the bare fiber connection system of FIG. 1 showing a retractable shroud in an extended position in accordance with the principles of the present disclosure.
Figure 3:
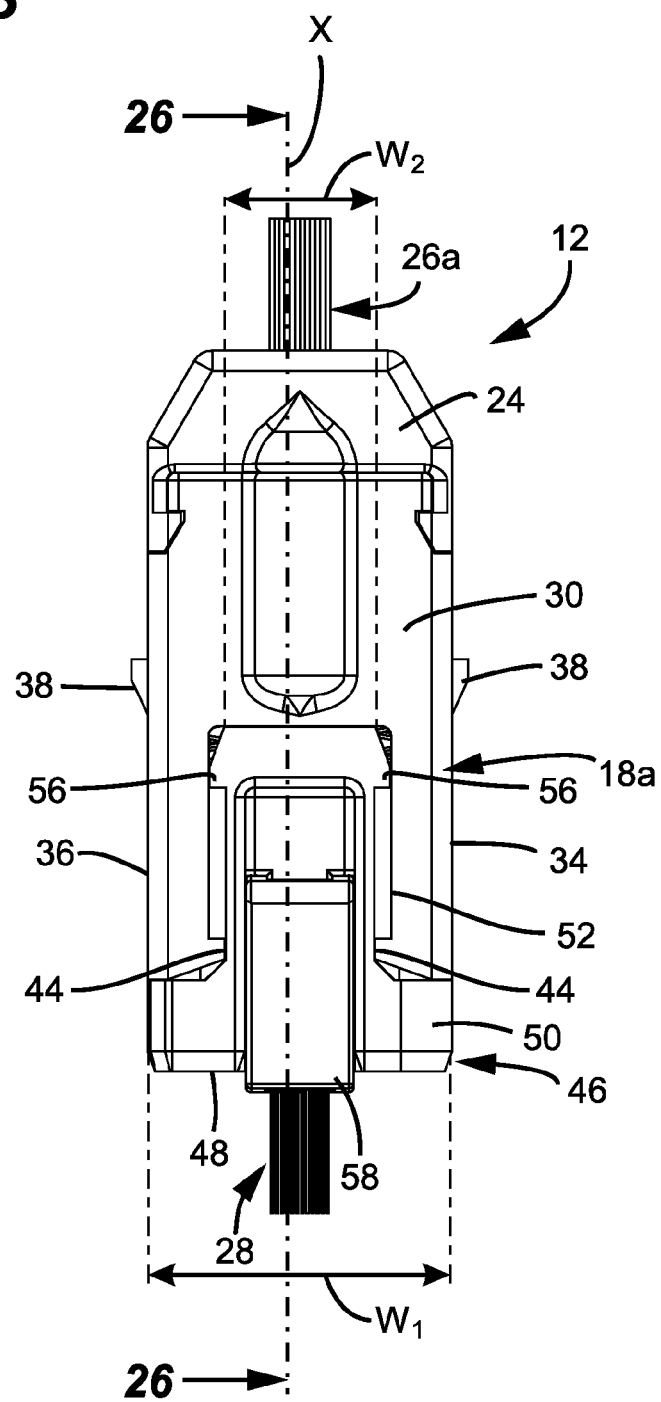
FIG. 3 illustrates a top view of the first multi-fiber fiber optic connector of the bare fiber connection system of FIG. 1 showing the retractable shroud in a retracted position.
Figure 4:
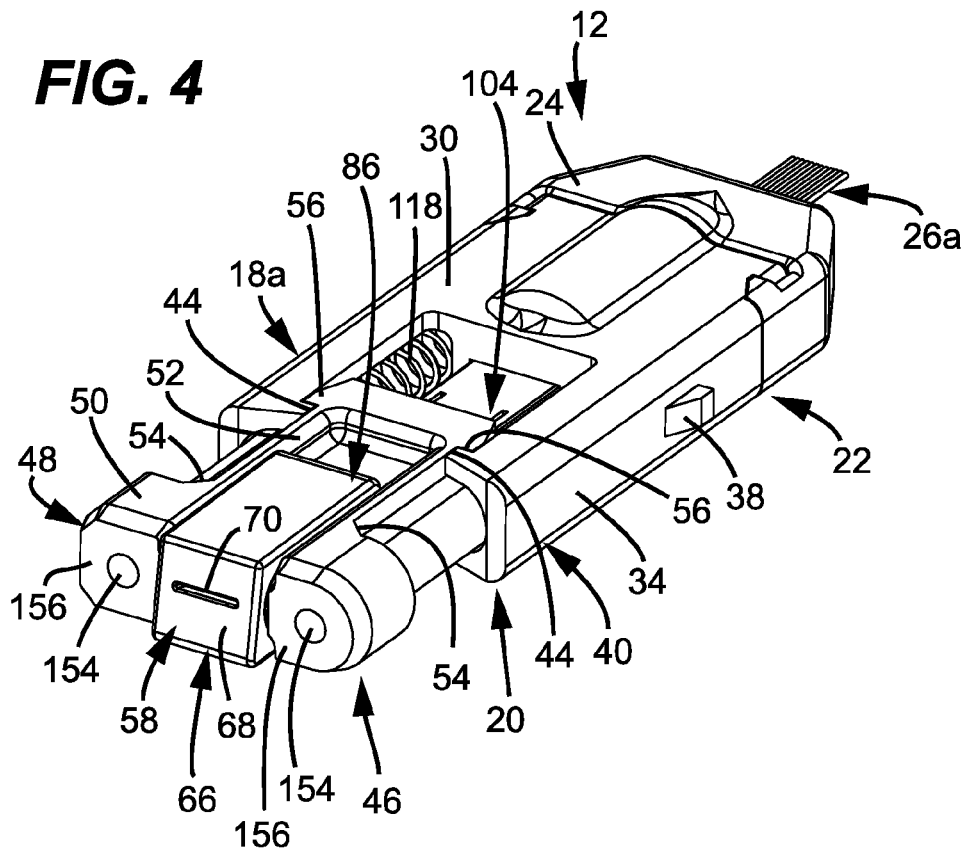
FIG. 4 illustrates a perspective view of the first multi-fiber fiber optic connector of FIG. 2 showing an example pivotal locking member in a closed position in accordance with the principles of the present disclosure.

Turning to FIGS. 2-4, the connector body 18a of the first multi-fiber optic connector 12 has a first major side (e.g., top side) 30, an opposite, second major side (e.g., bottom side) 32 (see FIG. 16), a first minor side 34, and an opposite, second minor side 36. In certain examples, the first and second minor sides 34, 36 of the connector body 18 include a fixed catch 38. The connector body 18a further includes a first latch 40 at the first minor side 34 of the connector body 18a and a second latch 42 at the second minor side 36 of the connector body 18a. The first and second latches 40, 42 of the connector body 18a can each include a retention element 44.

The bare fiber connection system 10 includes a shutter assembly 46 that includes a retractable shroud (e.g., nose piece) 48 that mounts at the front end 20 of the connector body 18a. The retractable shroud 48 can be moveable along the longitudinal axis X relative to the connector body 18a between a forward position (e.g., extended position)(see FIG. 2) and a rearward position (e.g., retracted position)(see FIG. 3). The retractable shroud 48 includes a head portion 50 and a main body portion 52. A tapered section 54 is provided between the head portion 50 and the main body portion 52 such that the main body portion 52 extends from the tapered section 54 such that a width $W_1$ of the head portion 50 is greater than a width $W_2$ of the main body portion 52. The main body portion 52 includes a coupling element 56 on opposing sides of the retractable shroud 48 for coupling with the connector body 18a. That is, the coupling element 56 can be configured to releasably interlock with the retention elements 44 of the connector body 18a to interconnect the retractable shroud 48 with the connector body 18a when the retractable shroud 48 is mounted between the first and second latches 40, 42.

Figure 5:
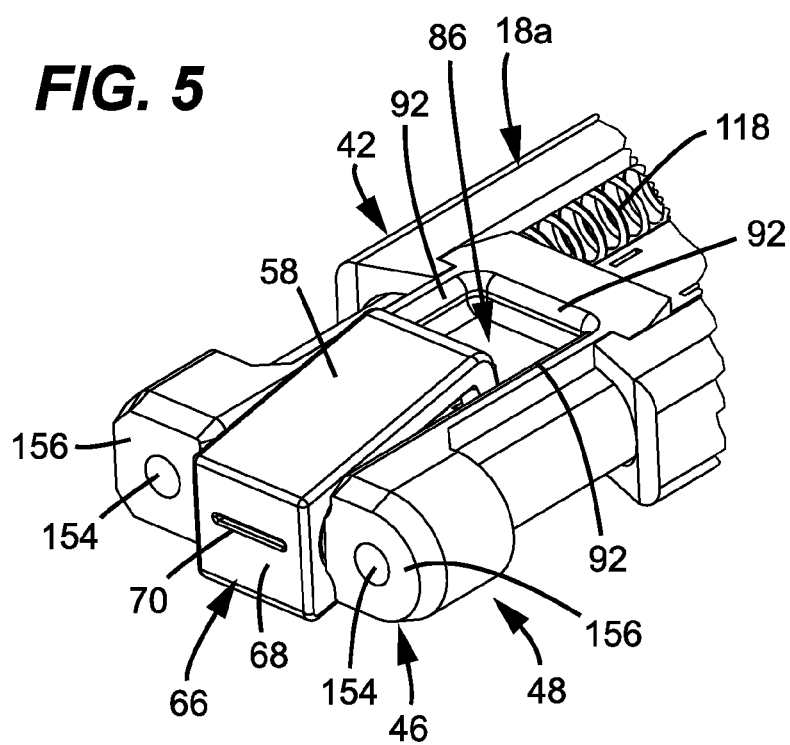
FIG. 5 illustrates a perspective partial view of the first multi-fiber fiber optic connector of FIG. 4 showing the pivotal locking member of FIG. 4 in an open position.
Figure 6:
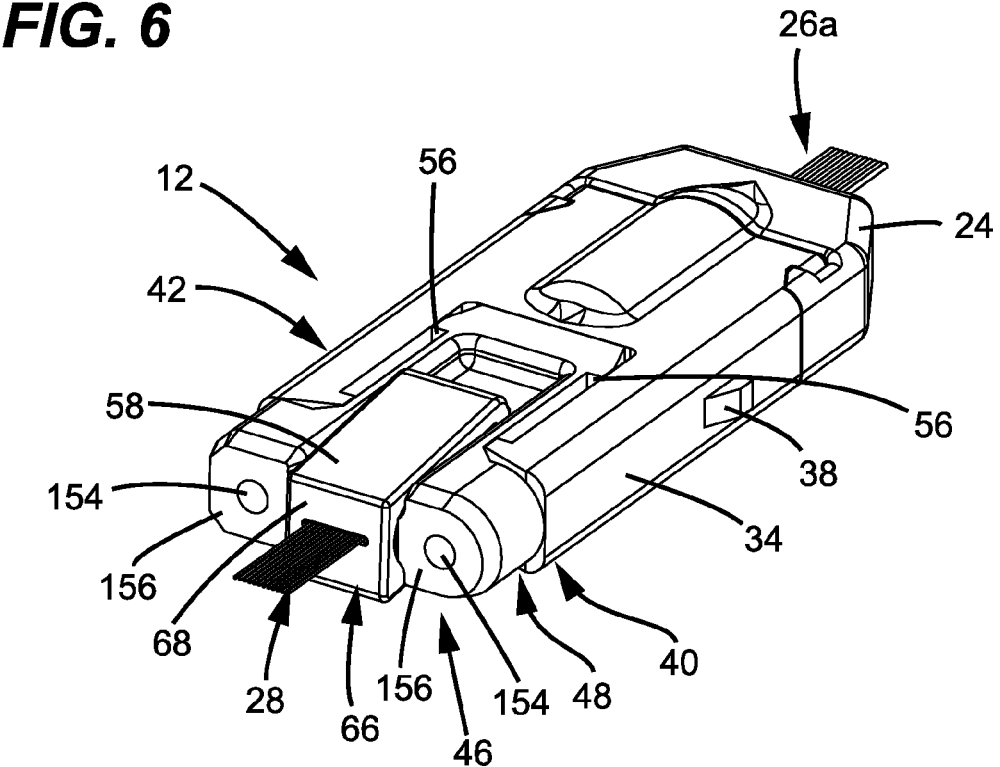
FIG. 6 illustrates a perspective view of the first multi-fiber fiber optic connector of FIG. 3 showing fiber ends projecting through the pivotal locking member.
Figure 7:
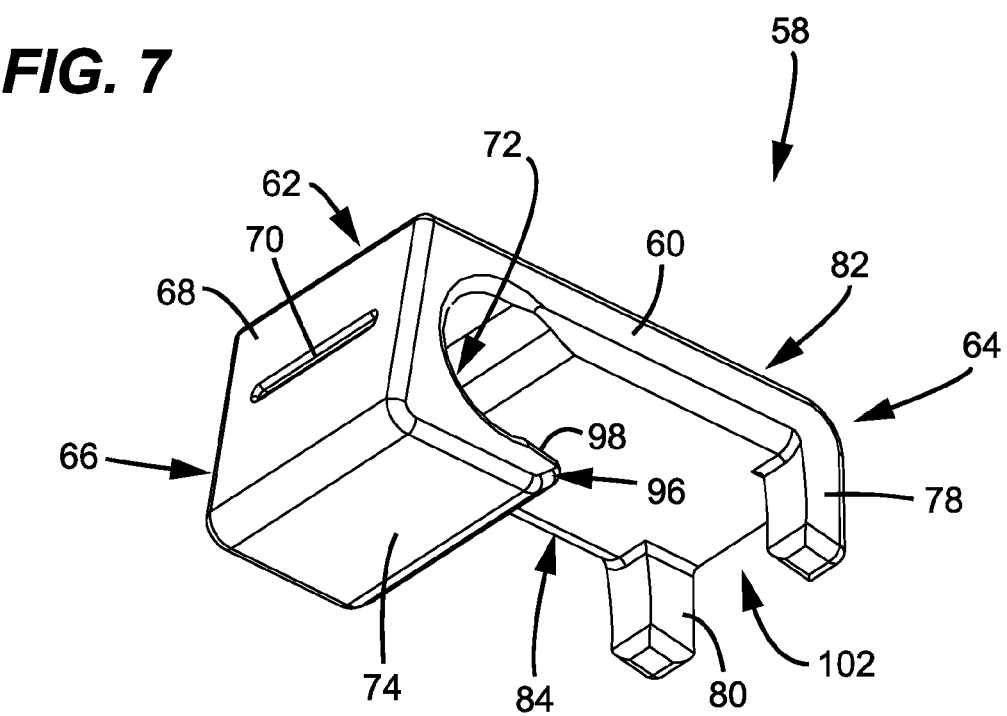
FIG. 7 illustrates a perspective view of the pivotal locking member of FIG. 4.
Figure 8:
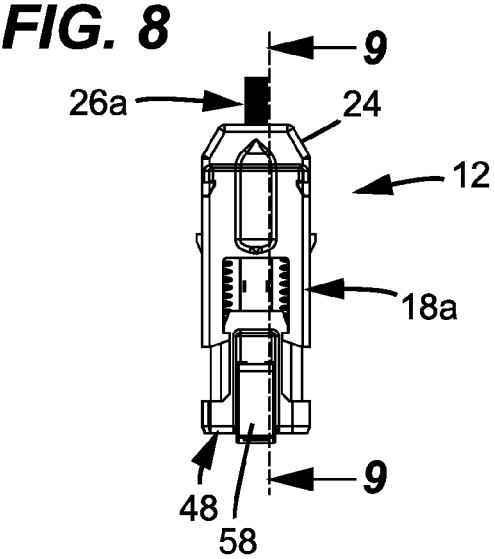
FIG. 8 illustrates a top view of the first multi-fiber fiber optic connector.
Figure 9:
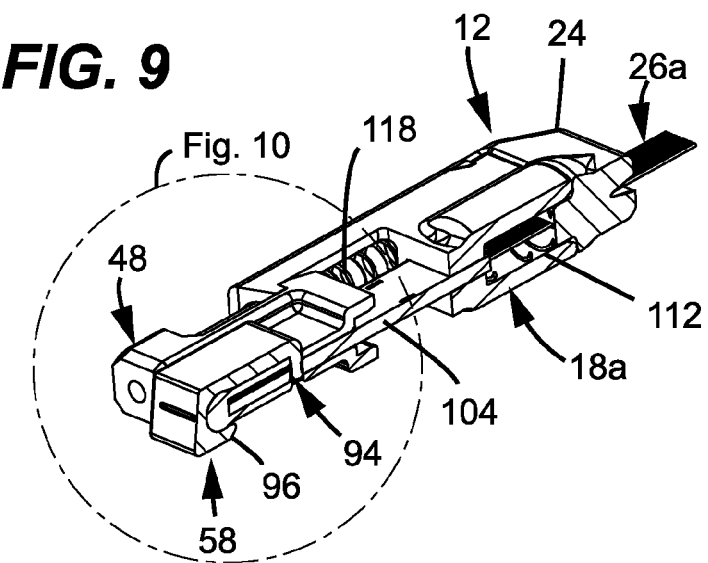
FIG. 9 illustrates a cross-sectional perspective view taken along line 9-9 of FIG. 8.

Referring to FIGS. 5-7, the shutter assembly 46 also includes an example pivotal locking member 58 that is rotatably coupled to a distal end of the retractable shroud 48. The pivotal locking member 58 incudes a main body 60 that extends between a first end 62 and an opposite second end 64. The pivotal locking member 58 includes a shield member 66 shown extending in a direction perpendicular to the main body 60 at the first end 62. The shield member 66 has a distal end face 68 that defines a longitudinal slot 70. The shield member 66 is configured to cover the distal end of the retractable shroud 48 to protect fiber ends 28 of the optical fibers 26 positioned within the retractable shroud from contamination when the retractable shroud 48 is in the extended position.

Figure 10:
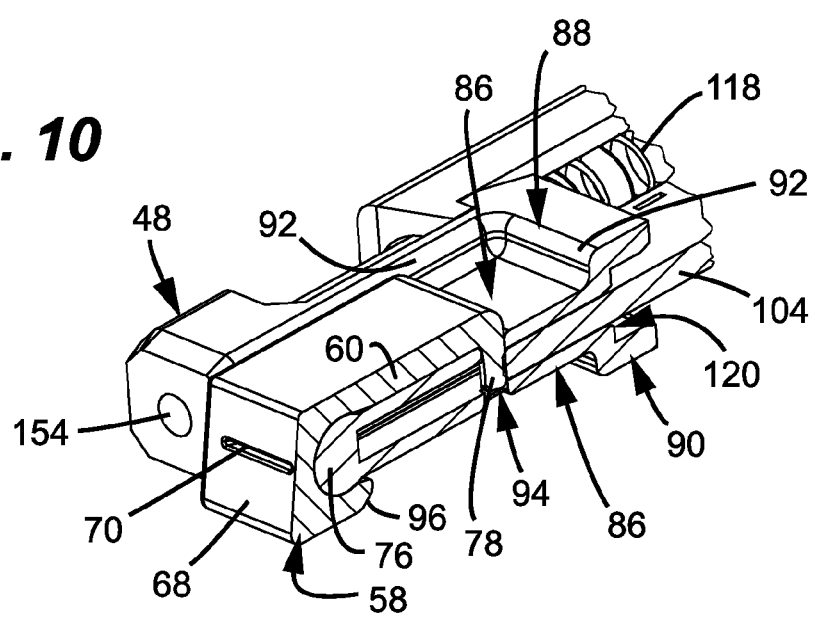
FIG. 10 illustrates an enlarged perspective view of a portion of the first multi-fiber fiber optic connector of FIG. 9.

The pivotal locking member 58 defines a C-shaped seat 72 (e.g., hinge joint) formed by the main body 60, the shield member 66 and a base member 74. When the pivotal locking member 58 is mounted to the retractable shroud 48, a spherical body portion 76 (see FIG. 10) of the retractable shroud 48 is mounted in the C-shaped seat 72 to form a hinge type joint.

The pivotal locking member 58 also includes first and second fingers 78, 80 (e.g., projections, legs) located on respective, opposing first and second sides 82, 84 of the pivotal locking member 58. The first and second fingers 78, 80 can extend in a direction perpendicular to the main body 60 at the second end 64 thereof. The first and second fingers 78, 80 are parallel to the shield member 66.

Turning to FIGS. 8-13, a recess 86 is defined in a first major side 88 (e.g., top side) of the retractable shroud 48 and in a second major side 90 (e.g., bottom side) of the retractable shroud 48. The respective recesses 86 are defined by sidewalls 92 at the first and second major sides 88, 90 of the retractable shroud 48. Two separate apertures 94 are defined in each of the recesses 86 at the first and second major sides 88, 90 of the retractable shroud 48 for receiving the first and second fingers 78, 80, respectively, when the pivotal locking member 58 is mounted to the retractable shroud 48. The pivotal locking member 58 can be rotatably coupled to the retractable shroud 48 such that the first and second fingers 78, 80 extend through the apertures 94 from either the first major side 88 or the second major side 90 of the retractable shroud 48.

Figure 14:
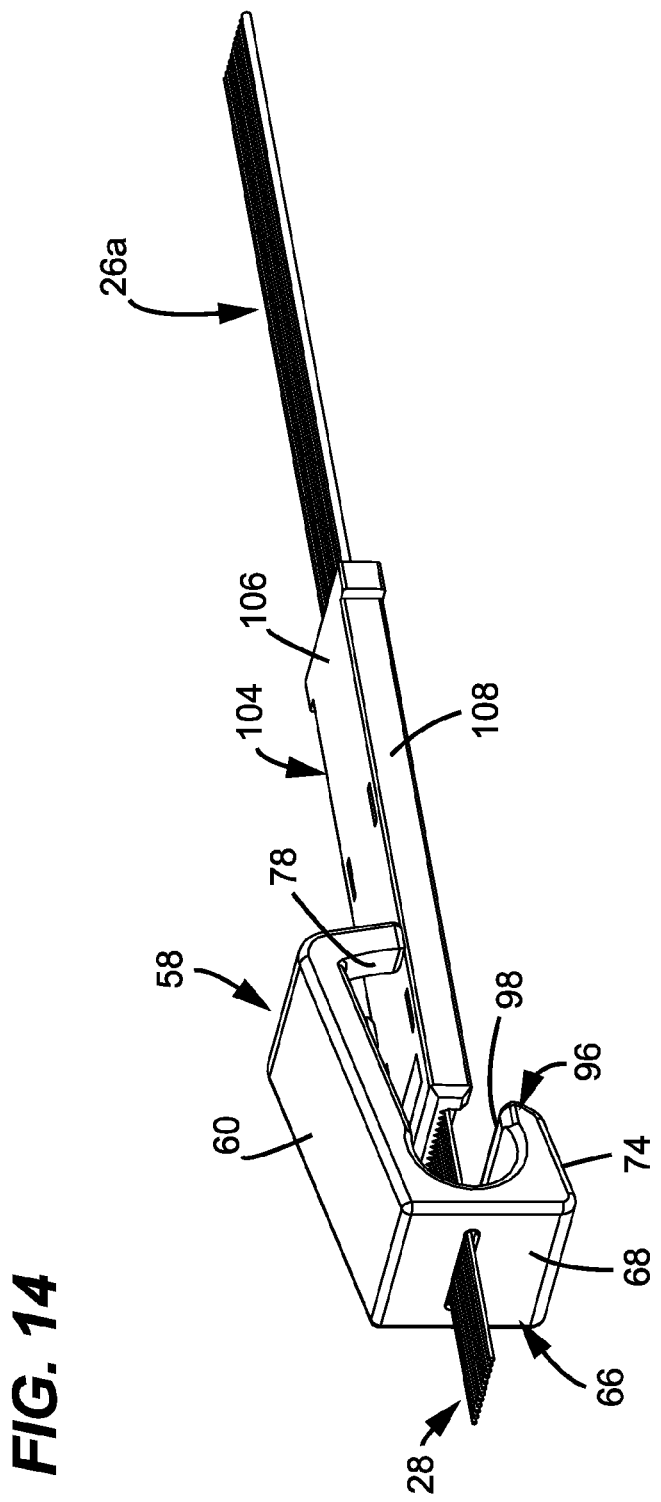
FIG. 14 illustrates a perspective view of the pivotal locking member relative to a fiber holder of the bare fiber connection system of FIG. 1.

The base member 74 of the pivotal locking member 58 includes a rotating-stop lip 96 that has a flat surface 98 (see FIG. 14). When the retractable shroud 48 is pivoted to the open position, the flat surface 98 of the rotating-stop lip 96 engages with a surface 100 of the retractable shroud 48 within the recess 86 of one of the first and second major sides 88, 90. An opening 102 (see FIG. 7) defined between the first and second fingers 78, 80 of the pivotal locking member 58 allows the optical fibers 26 to extend therethrough.

Turning to FIG. 14, the bare fiber connection system 10 can include a fiber holder 104. The fiber holder 104 can be mounted in the first multi-fiber fiber optic connector 12. In certain examples, the fiber holder 104 may include a cover 106 and a base 108. The cover 106 can be mounted to the base 108 via a snap-fit connection, a press-fit connection, or a pivotal connection. In certain examples, the fiber holder 104 can include a one-piece body. For example, the fiber holder 104 can be a single unitary piece made by a molding process. In other examples, the cover 106 may include two pieces. In certain examples, the two pieces of the cover can be connected together via a living hinge. Various fiber holders are disclosed by U.S. Provisional Application Ser. No. 63/071,779, filed Aug. 28, 2020; and U.S. Provisional Application Ser. No. 63/104,646, filed Oct. 23, 2020; both entitled "LOW PROFILE FIBER HOLDERS FOR USE WITH BARE FIBER MULTI-FIBER FIBER OPTIC CONNECTORS", which are hereby incorporated by reference in their entireties.

When the pivotal locking member 58 is in the closed position, the first and second fingers 78, 80 are received in the apertures 94 of the retractable shroud 48 to prevent the retractable shroud 48 from moving from the extended position to the retracted position relative to the connector body 18a, which also protects the fiber ends 28 from being inadvertently crushed. As such, the first and second fingers 78, 80 can function as a stop to lock the retractable shroud 48 relative to the connector body 18a. The first and second fingers 78, 80 extend through the apertures 94 to oppose a front end of the fiber holder 104 to prevent the fiber holder 104 from advancing forward.

Figure 23:
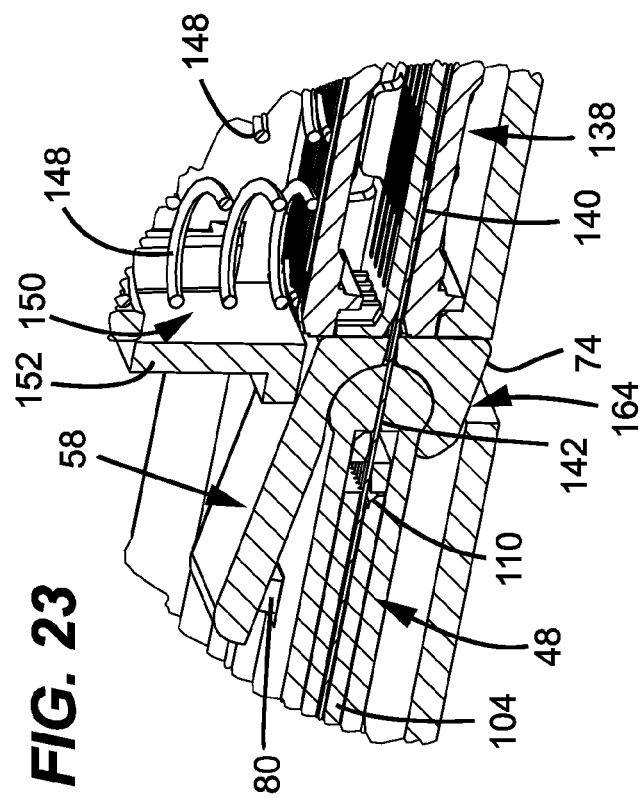
FIG. 23 illustrates an enlarged perspective view of a portion of the bare fiber connection system of FIG. 22.
Figure 21:
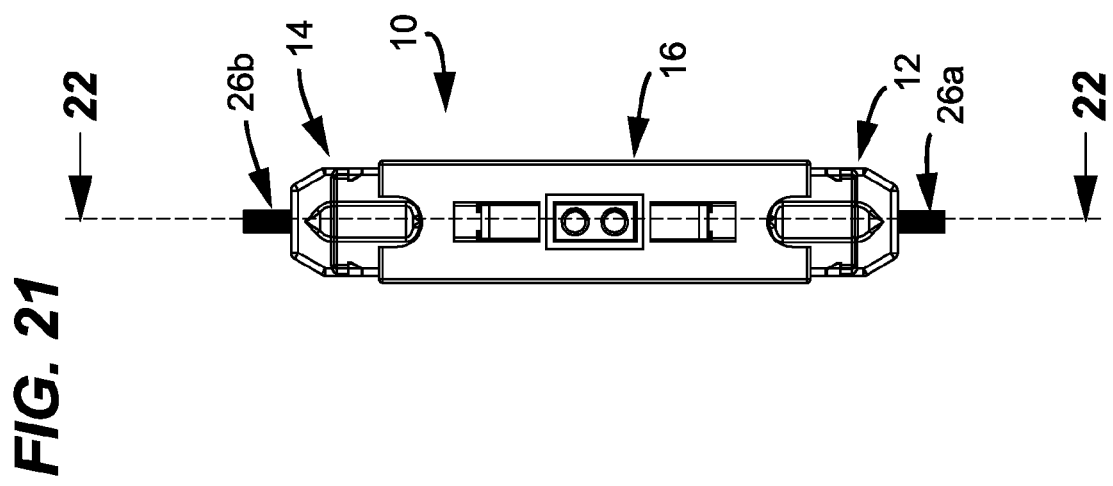
FIG. 21 illustrates atop view of the bare fiber connection system of FIG. 1 with the first and second multi-fiber fiber optic connectors fully inserted in the first and second mating adapter ports of the multi-fiber adapter.
Figure 24:
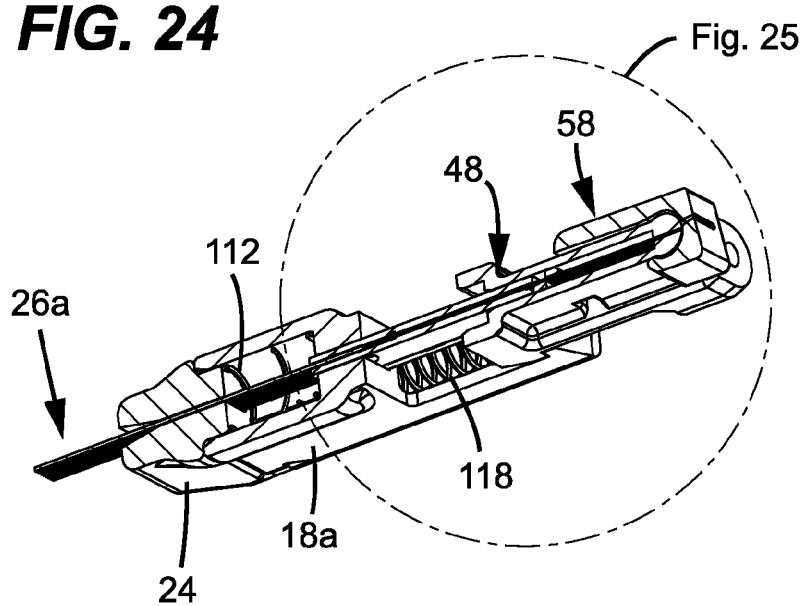
FIG. 24 illustrates a cross-sectional perspective view of the first multi-fiber fiber optic connector taken along line 24-24 of FIG. 2.
Figure 25:
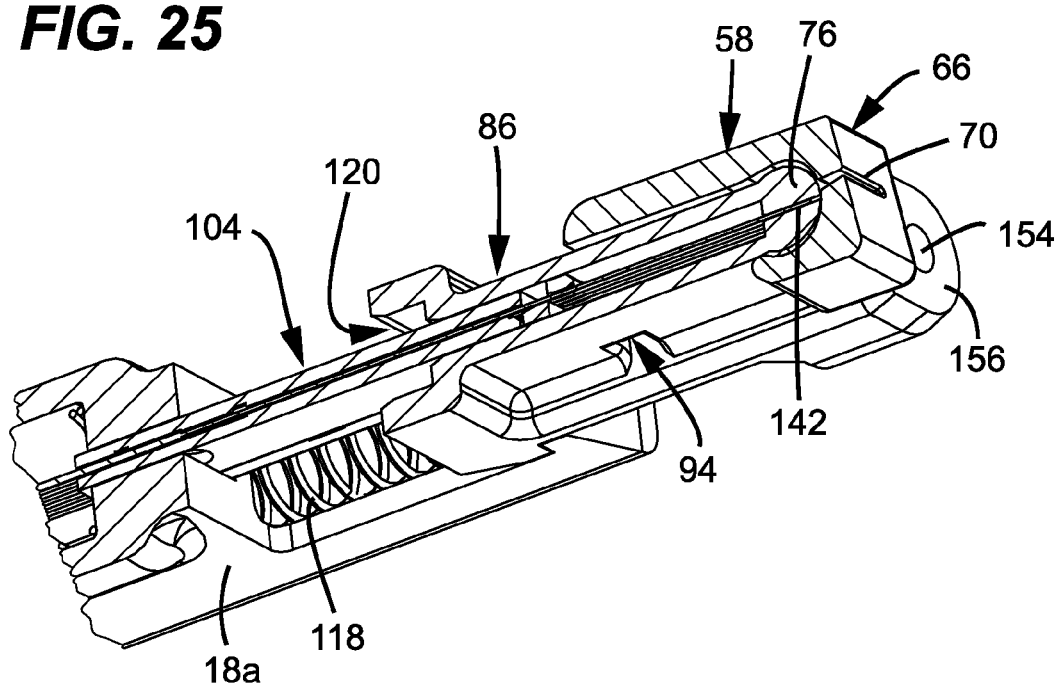
FIG. 25 illustrates an enlarged perspective view of a portion of the first multi-fiber fiber optic connector of FIG. 24.
Figure 26:
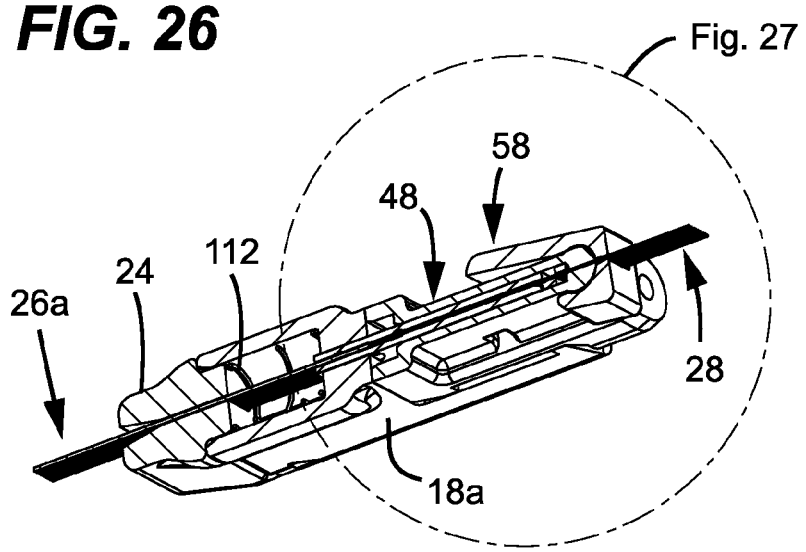
FIG. 26 illustrates a cross-sectional perspective view of the first multi-fiber fiber optic connector taken along line 26-26 of FIG. 3.
Figure 27:
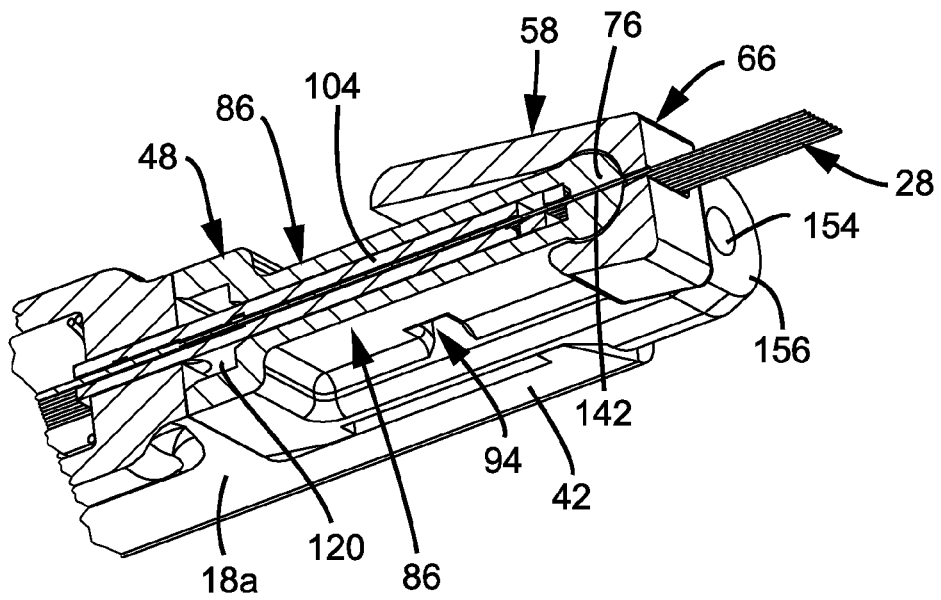
FIG. 27 illustrates an enlarged perspective view of a portion of the first multi-fiber fiber optic connector of FIG. 26.

The first plurality of optical fibers 26a routed through the first multi-fiber fiber optic connector 12 can be anchored to the base 108 of the fiber holder 104. The base 108 of the fiber holder 104 may have fiber positioning grooves 110 (see FIG. 23) for receiving the first plurality of optical fibers 26a. In certain examples, the fiber positioning grooves 110 can be V-shaped grooves and/or U-shaped grooves, although alternatives are possible.

The connector body 18a may also include a rear outboard spring 112 (see FIG. 9) for biasing the fiber holder 104 in a forward direction. The rear outboard spring 112 can be captured between the rear piece connector body 24 and the fiber holder 104. The rear piece connector body 24 defines an opening 114 (see FIG.) for routing the first plurality of optical fibers 26a therethrough.

Turning again to FIG. 2, a first outboard spring 116 of the first multi-fiber fiber optic connector 12 may be positioned adjacent to the first minor side 34 of the connector body 18a and a second outboard spring 118 may be positioned adjacent to the second minor side 36 of the connector body 18a. The first and second outboard springs 116, 118 are mounted at an inner side of the first and second latches 40, 42, respectively. The first and second outboard springs 116, 118 can have lengths that extend along the longitudinal axis of the first multi-fiber fiber optic connector 12. The first and second outboard springs 116, 118 may be configured to bias the retractable shroud 48 to the extended position relative to the connector body 18a. In certain examples, the fiber holder 104 can be positioned between the first and second outboard springs 116, 118. The fiber holder 104 and optical fibers 20a can be received within a rear opening 120 of the retractable shroud 48.

Figure 15:
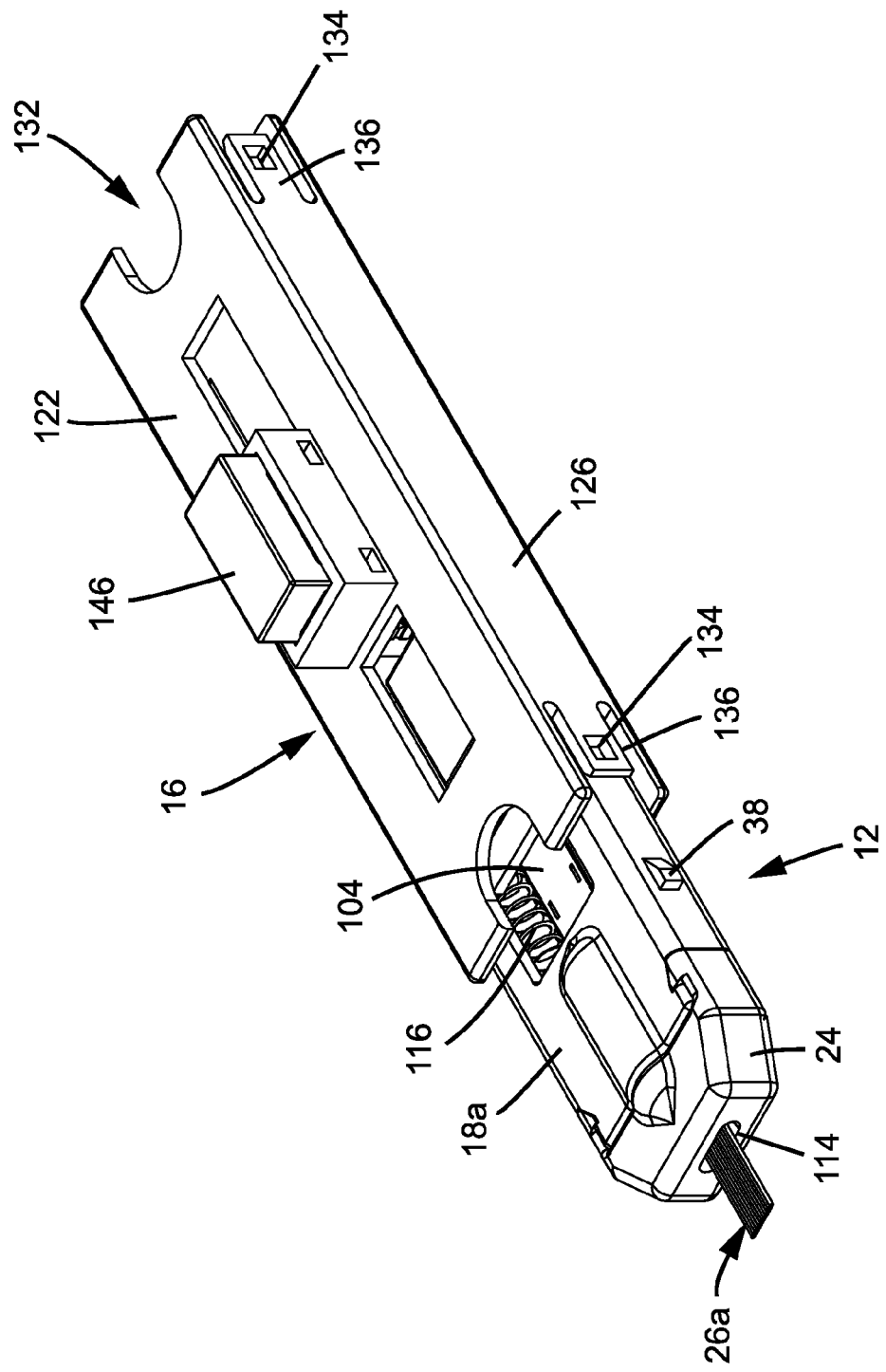
FIG. 15 illustrates a perspective view of the first multi-fiber fiber optic connector partially inserted in a mating adapter port of the multi-fiber adapter of FIG. 1.
Figure 16:
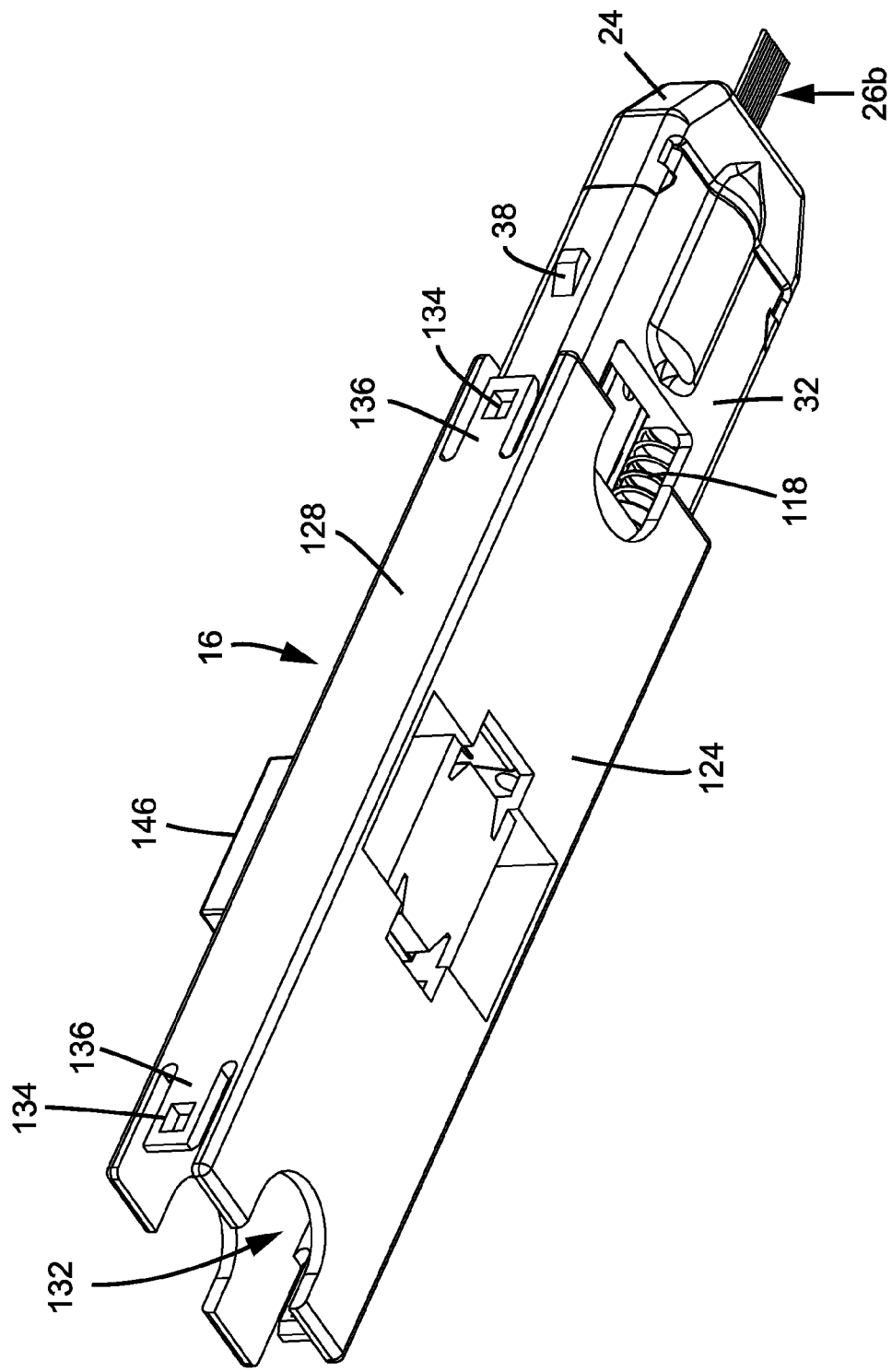
FIG. 16 illustrates an opposite perspective view of the first multi-fiber fiber optic connector partially inserted in the mating adapter port.
Figure 17:
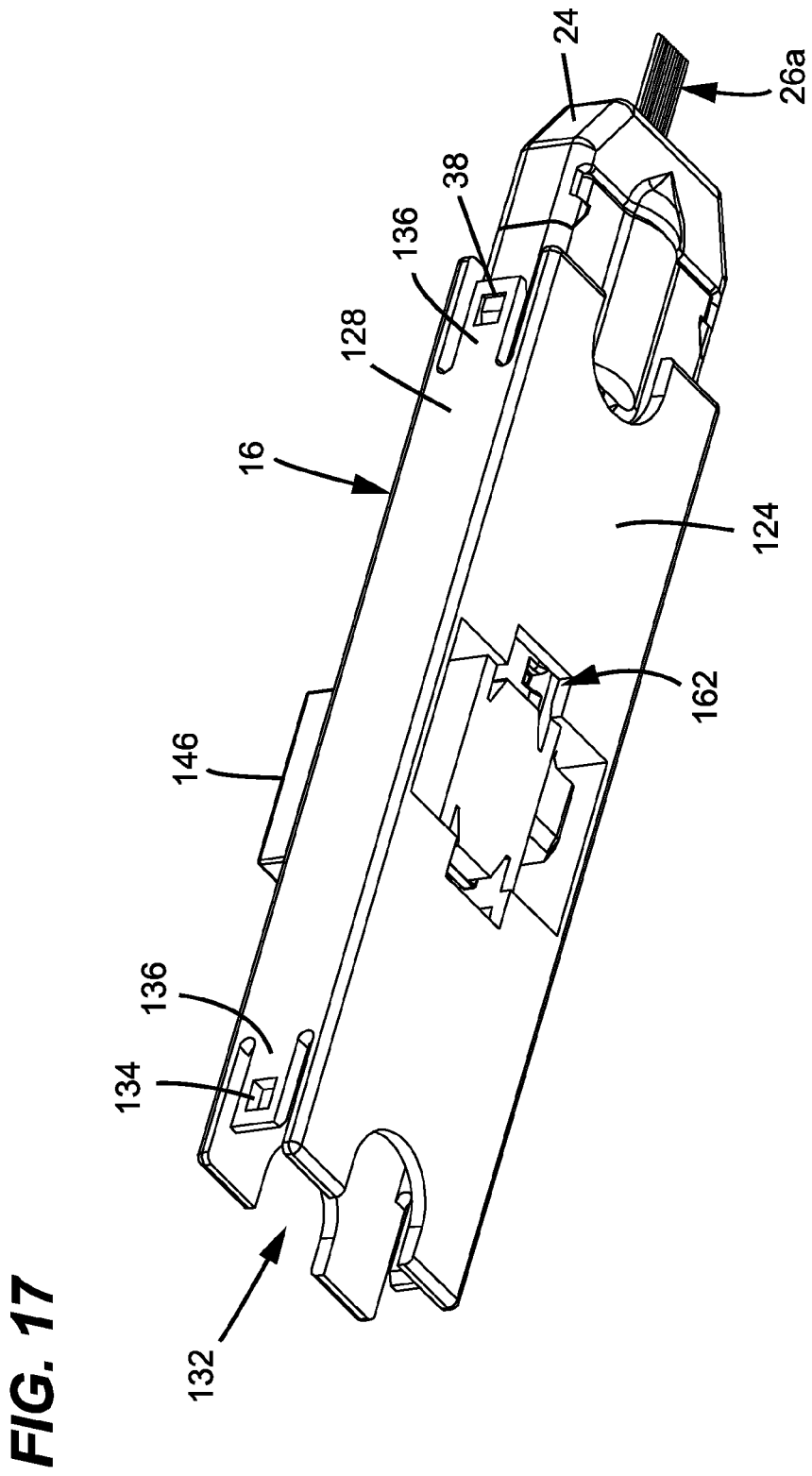
FIG. 17 illustrates a perspective view of the first multi-fiber fiber optic connector fully inserted and latched in the mating adapter port.
Figure 19:
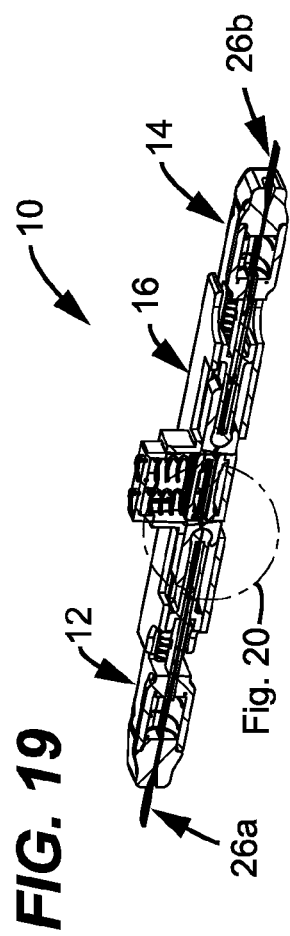
FIG. 19 illustrates a cross-sectional perspective view take along line 19-19 of FIG. 18

Turning to FIGS. 15-17, the multi-fiber adapter 16 can be used to assist in optically coupling together the first and second multi-fiber fiber optic connectors 12, 14. The multi-fiber adapter 16 includes a first major adapter side 122 (e.g., top), an opposite, second major adapter side 124 (e.g., bottom), a first minor adapter side 126, and an opposite, second minor adapter side 128. The multi-fiber adapter 16 can include a first mating adapter port 130 (see FIG. 1) and a second mating adapter port 132 opposite the first mating adapter port 130 for respectively receiving the first and second multi-fiber fiber optic connectors 12, 14 to couple the first and second multi-fiber fiber optic connectors 12, 14 together.

When the first and second multi-fiber fiber optic connectors 12, 14 are respectively inserted into the first and second mating adapter ports 130, 132, the fixed catches 38 can engage apertures 134 defined in latches 136 of the multi-fiber adapter 16 as part of a latching arrangement to allow the first and second multi-fiber fiber optic connectors 12, 14 to be secured (e.g., interlocked) within the first and second mating adapter ports 130, 132 of the multi-fiber adapter 16.

Referring to FIGS. 18-23, the multi-fiber adapter 16 includes a groove-defining piece 138 (e.g., internal bare fiber alignment piece, alignment device) positioned between the first and second adapter ports 130, 132. The groove-defining piece 138 defines multiple fiber alignment grooves 140 (e.g., alignment passages) for receiving and co-axially aligning the fiber ends 28 of the first and second plurality of optical fibers 26a, 26b projecting forwardly beyond the retractable shroud 48 and the pivotal locking member 58 such that optical signals can be conveyed between the first and second plurality of optical fibers 26a, 26b of the first and second multi-fiber fiber optic connectors 12, 14. It will be appreciated that the multi-fiber adapter 16 is configured to receive optical fibers that are not supported by or secured within a ferrule. The multiple fiber alignment grooves 140 can be v-grooves or other shaped grooves (e.g., half circles, U-shaped grooves, etc.). It will be appreciated that other types of bare fiber alignment devices may be alternatively used with the multi-fiber adapter 16.

Turning to FIGS. 24-27, the retractable shroud 48 defines a plurality of fiber passages 142 through which the plurality of optical fibers 26a can extend. The fiber passages 142 of the retractable shroud 48 can be arranged and configured to align with the multiple fiber alignment grooves 140 of the groove-defining piece 138. In certain examples, relative movement is permitted between the retractable shroud 48 and the plurality of optical fibers 26a held by the fiber holder 104 so that the retractable shroud 48 can slide relative to the plurality of optical fibers 26a. The fiber ends 28 of the optical fibers 26a project forwardly beyond the retractable shroud 48 when the retractable shroud 48 is in the retracted position (see FIG. 27), and the fiber ends 28 are protected within the retractable shroud 48 when the retractable shroud 48 is in the extended position (see FIG. 25). In certain examples, the fiber ends 28 project at least 3, 4, 5 or 6 millimeters beyond the retractable shroud 48 when the retractable shroud 48 is fully retracted, although alternatives are possible.

Figure 20:
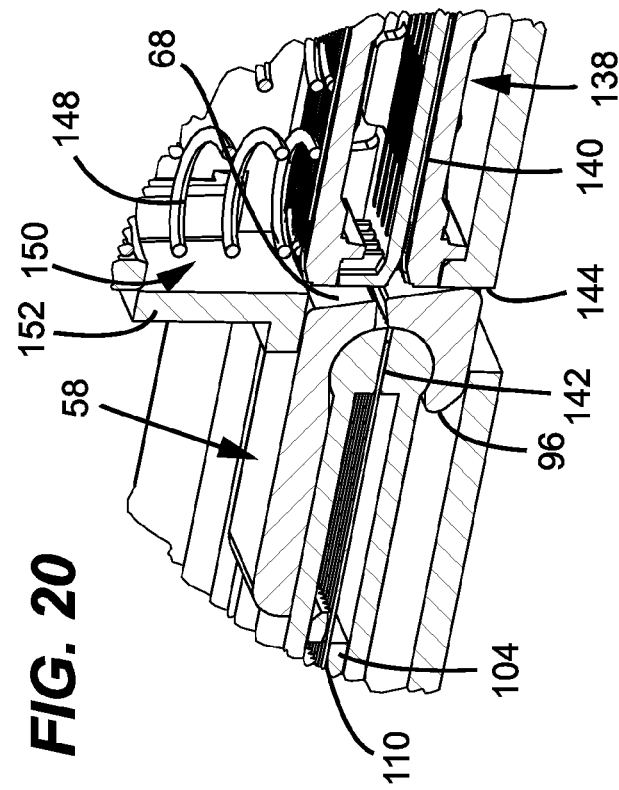
FIG. 20 illustrates an enlarged perspective view of a portion of the bare fiber connection system of FIG. 19.
Figure 18:
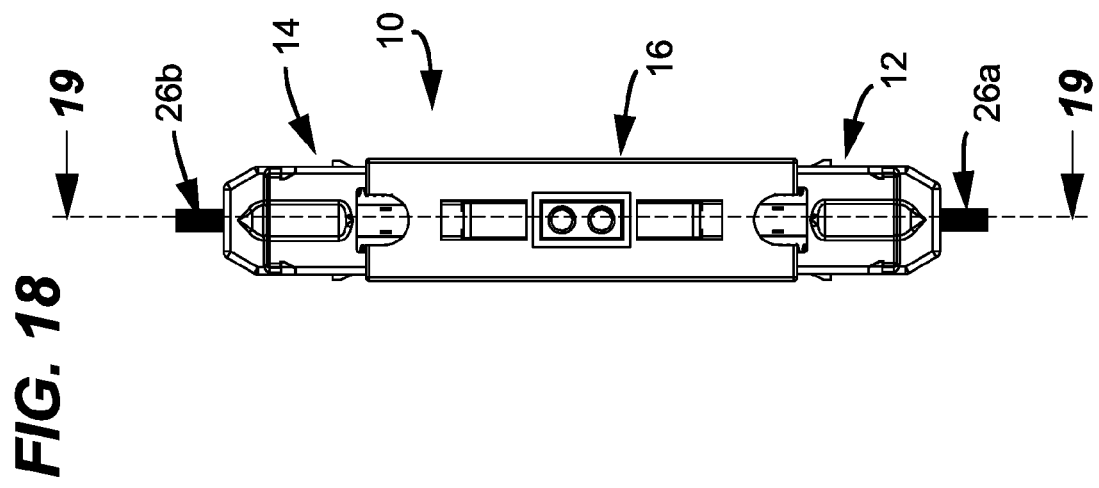
FIG. 18 illustrates atop view of the bare fiber connection system of FIG. 1 with the first and second multi-fiber fiber optic connectors partially inserted in first and second mating adapter ports of the multi-fiber adapter.
Figure 22:
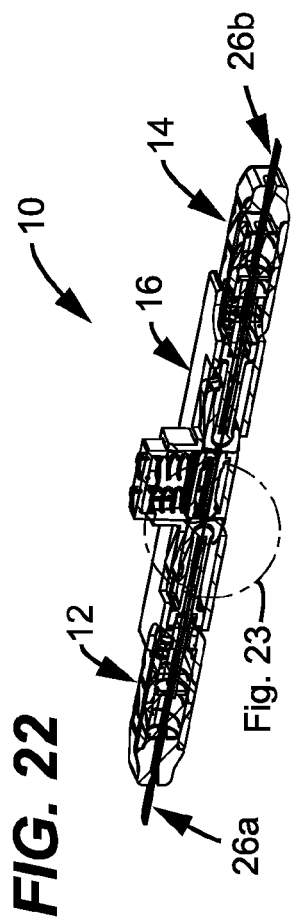
FIG. 22 illustrates a cross-sectional perspective view take along line 22-22 of FIG. 21

Turning to FIG. 20, the multi-fiber adapter 16 can include a shoulder 144 that is configured to engage the distal end face 68 of the shield member 66 of the pivotal locking member 58 as the first multi-fiber fiber optic connector 12 is inserted into the first mating adapter port 130. The shoulder 144 causes the pivotal locking member 58 to pivot downward from the closed position to the open position (see FIG. 23) such that the distal end face 68 of the shield member 66 is positioned flat with the groove-defining piece 138. The groove-defining piece 138 of the multi-fiber adapter 16 can also function as a stop for the distal end face 68 of the shield member 66 of the pivotal locking member 58 such that continued insertion of the first multi-fiber fiber optic connector 12 into the first mating adapter port 130 causes the connector body 18a to move relative to the retractable shroud 48 until the fixed catches 38 of the connector body 18a snap into the latches 136 of the multi-fiber adapter 16.

As the pivotal locking member 58 is pivoted to the open position, the first and second fingers 78, 80 of the pivotal locking member 58 are raised out of the apertures 94 of the retractable shroud 48 and ride on top of the fiber holder 104 (see FIG. 14) to prevent the pivotal locking member 58 from crushing the optical fibers 26. The pivotal locking member 58 can pivot or rotate until the rotating-stop lip 96 bottoms out against the retractable shroud 48 to prevent over-rotation of the pivotal locking member 58. When the pivotal locking member 58 is in the open position, the elongated slot 70 is aligned with the fiber passages 142 of the retractable shroud 48 (see FIG. 23). The plurality of fiber passages 142 of the retractable shroud 48 can align with the multiple fiber alignment grooves 140 of the groove-defining piece 138.

As the first multi-fiber fiber optic connecter 12 is inserted into the first mating adapter port 130, the retractable shroud 48 is unlocked and can retract relative to the connector body 18*a* and the fiber holder 104 into the retracted position. That is, the retractable shroud 48 is spring biased in a forward direction with respect to the connector body 18*a* and the fiber holder 104. When the pivotal locking member 58 is pivoted to be in contact with the shoulder 144 and the groove-defining piece 138 of the multi-fiber adapter 16, the plurality of fiber passages 142 of the retractable shroud 48 are aligned with the multiple fiber alignment grooves 140 of the groove-defining piece 138. The pivotal locking member 58 of the first multi-fiber fiber optic connector 12 functions as an automatic shutter that is pivoted or rotated between open and closed positions. The pivotal locking member 58 is preferably not removed prior to insertion of the first multi-fiber fiber optic connector 12 within the multi-fiber adapter 16. The pivotal locking member 58 can remain attached to the retractable shroud 48 and simply rotate between a locked position and an unlocked position such that the pivotal locking member 58 does not need to be removed to allow the optical fibers 26 to extend through the retractable shroud 48.

Continued insertion of the first multi-fiber fiber optic connector 12 into the first mating adapter port 130 causes the connector body 18*a* to move relative to the fixed retractable shroud 48 which forces the fiber holder 104 forward such that the plurality of optical fibers 24*a*, 24*b* can slide through the fiber passages 142 of the retractable shroud 48 and through the elongated opening 70 of the pivotal locking member 58. The fiber holder 104 is axially moveable relative to the connector body 18*a* and is preferably spring biased in a forward direction relative to the connector body 18*a*. The fiber holder 104 can be pushed back against the rear outboard spring 112 when the first multi-fiber fiber optic connector 12 is mated with the second multi-fiber fiber optic connector 14 and opposed fiber ends 28 of the first and second multi-fiber fiber optic connectors 12, 14 are optically coupled together.

Figure 28:
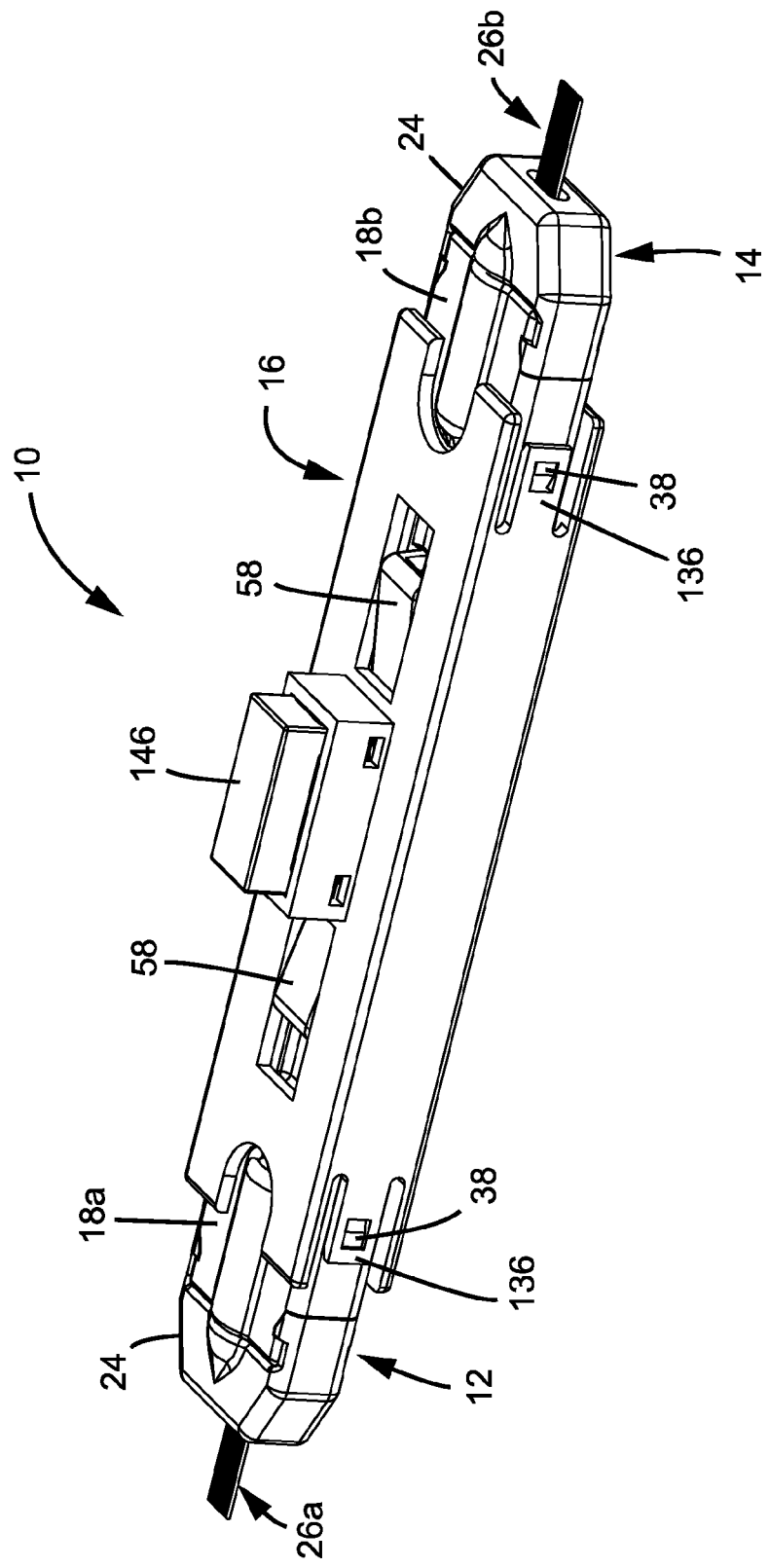
FIG. 28 illustrates a perspective view of the bare fiber connection system of FIG. 21.

The fiber ends 28 can project from the plurality of fiber passages 142 of the retractable shroud 48 into the multiple fiber alignment grooves 140 of the groove-defining piece 138. The same can be true of the second multi-fiber fiber optic connector 14 such that the first and second plurality of optical fibers 26*a*, 26*b* can be optically coupled together as depicted in FIG. 28.

The multiple fiber alignment grooves 140 of the groove-defining device 138 can extend along the longitudinal axis X or fiber insertion axis to receive the fiber ends 28 of the plurality of optical fibers 26*a* projecting forwardly beyond the retractable shroud 48. The multiple fiber alignment grooves 140 can be configured for receiving and co-axially aligning the fiber ends 28 of the plurality of optical fibers 26*a* of the first multi-fiber fiber optic connector 12 with optical fibers 26*b* of the second multi-fiber fiber optic connector 14 such that optical signals can be conveyed therebetween.

The multi-fiber adapter 16 may include an adapter cover 146 (see FIG. 15) that can engage the groove-defining device 138 via biasing component(s) 148 (e.g., a spring, a leaf spring)(see FIG. 20). The adapter cover 146 can be configured to fit within a receptacle 150 (see FIG. 20) of an adapter cover support structure 152 (see FIG. 20) to generate spring biasing load/force that translates through the groove-defining device 138 for pressing the optical fibers 26*a*, 26*b* into their corresponding fiber alignment grooves 140.

In certain examples, a pair of guide holes 154 (see FIGS. 4-6) may be formed on an end face 156 of the retractable shroud 48 which can cooperate with guide pins (not shown) on the groove-defining device 138.

Figure 29:
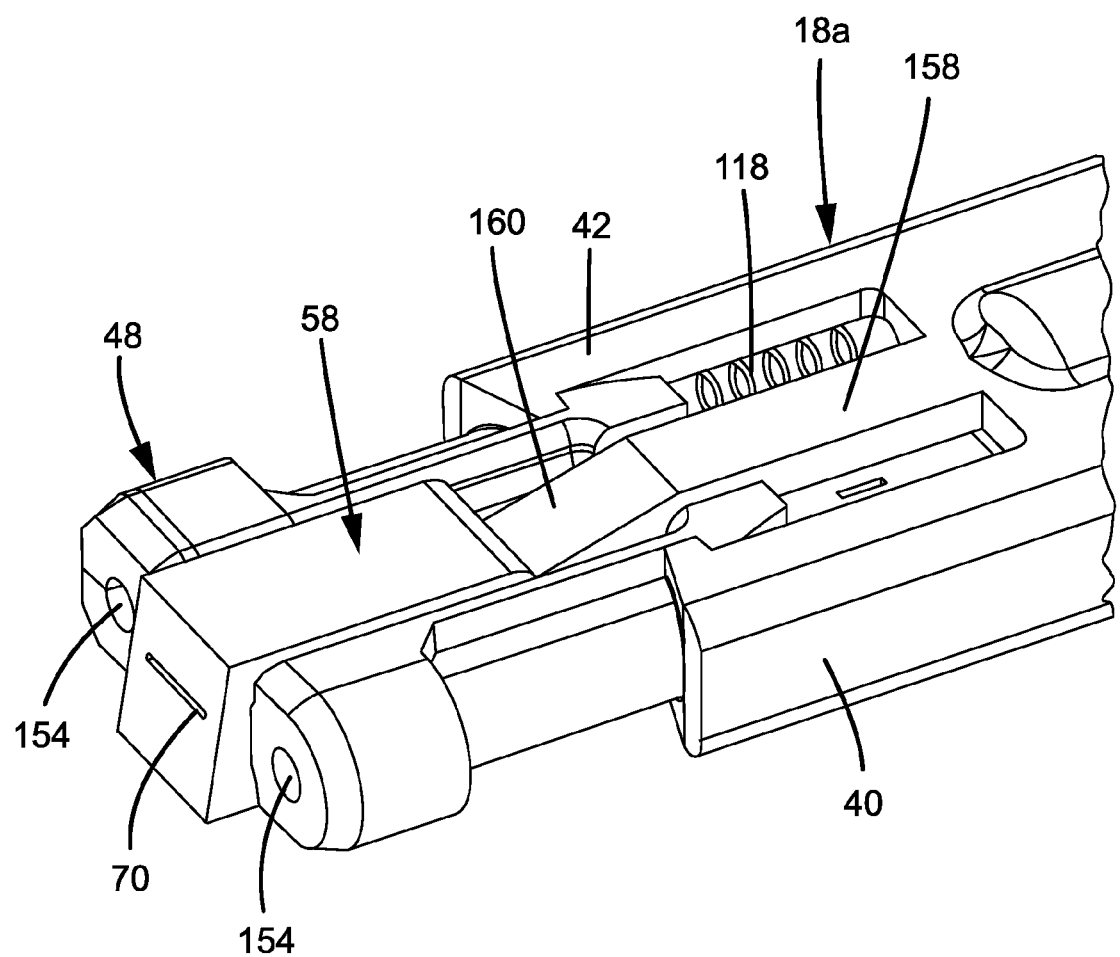
FIG. 29 illustrates a perspective view of the first multi-fiber fiber optic connector showing an extension member in accordance with the principles of the present disclosure.

In certain examples, the connector body 18*a* may include an extension member 158 (see FIG. 29) at the first major side 30. The extension member 158 can act as a wedge to help pry the pivotal locking member 58 up and in the open position. The extension member 158 can have a tapered member 160 that is angled downwardly relative to the extension member 158. As the first multi-fiber fiber optic connector 12 is inserted in the first mating adapter port 130, the tapered member 160 can slide underneath the pivotal locking member 58 to wedge the pivotal locking member 58 up and cause it to pivot from the closed position to the open position.

Turning again to FIG. 17, the multi-fiber adapter 16 defines a cutout 162 at the second major adapter side 124 thereof. When the first multi-fiber fiber optic connector 12 is pulled out of the multi-fiber adapter 16 by unlatching the fixed catches 38 from the latches 136 of the multi-fiber adapter 16, the base member 74 of the pivotal locking member 58 can engage an edge 164 (see FIG. 23) of the cutout 162. As the first multi-fiber fiber optic connector 12 is removed from the multi-fiber adapter 16, the base member 74 of the pivotal locking member 58 slides over the edge 164 of the cutout 162 causing the pivotal locking member 58 to automatically pivot back to the locked position.

Figure 30:
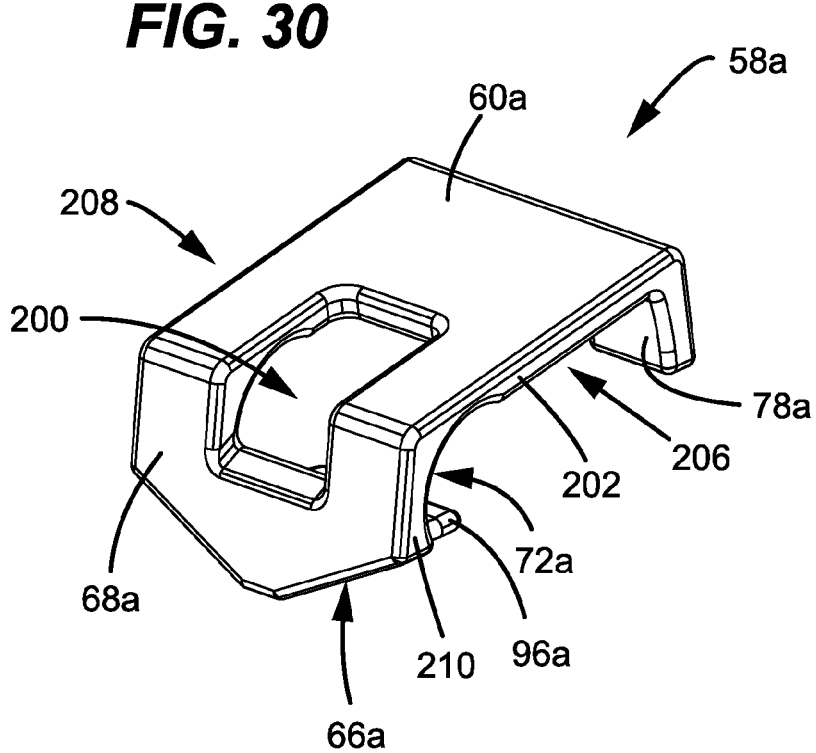
FIGS. 30-31 illustrate perspective views of another example pivotal locking member in accordance with the principles of the present disclosure.
Figure 31:
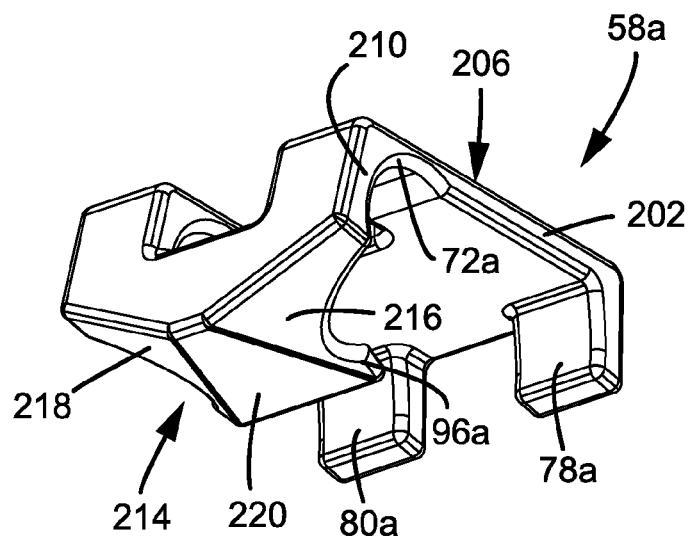

Referring to FIGS. 30-31, an alternative pivotal locking member 58*a* is depicted in accordance with the principles of the present disclosure. The pivotal locking member 58*a* includes a main body 60*a* that extends between a first end 262 and an opposite, second end 264. The pivotal locking member 58*a* includes a shield member 66*a* shown extending in a direction perpendicular to the main body 60*a* at the first end 262. The shield member 66*a* has a distal end face 68*a* that defines a cutout 200 that extends into a portion of the main body 60*a*. The cutout 200 allows the pivotal locking member 58*a* to flex and bend more uniformly when snapped over the front of the retractable shroud 48*a*.

The main body 60*a* of the pivotal locking member 58*a* can include main body side walls 202, 204 on opposing sides 206, 208 of the pivotal locking member 58*a*. The shield member 66*a* may also include shield side walls 210, 212 that extend on the opposing sides 206, 208 of the pivotal locking member 58*a*. The shield side walls 210, 212 extending perpendicular relative to the main body side walls 202, 204. The main body side walls 202, 204 and the shield side walls 210, 212 together defining a semi-circular seat 72*a* that mounts over a spherical body portion 76*a* of a retractable shroud 48*a* (See FIG. 32). The shield member 66*a* is configured to cover a distal end of the retractable shroud 48*a* to shield fiber ends 28 of the optical fibers 26 within the retractable shroud 48*a* from contamination.

The pivotal locking member 58*a* also includes first and second fingers 78*a*, 80*a* located on the respective, opposing first and second sides 206, 208 of the pivotal locking member 58*a*. The first and second fingers 78*a*, 80*a* can extend in a direction perpendicular to the main body 60*a* at the second end 264 thereof. The first and second fingers 78*a*, 80*a* are parallel to the shield member 66*a*. The first and second fingers 78*a*, 80*a* are configured to extend into the respective apertures 94 defined in the retractable shroud 48*a*.

The shield member 66*a* includes a base member 214 with a first tapered portion 216, a second tapered portion 218 and a flat portion 220 between the first and second tapered portions 216, 218. The first and second tapered portions 216, 218 of the pivotal locking member 58*a* provides flexibility and bends uniformly to snap over the retractable shroud 48*a*. The base member 214 also has a rotating-stop lip 96*a* configured to engage an underside (e.g., bottom side) of the retractable shroud 48*a* when the pivotal locking member 58*a* is in the open position. The pivotal locking member 58*a* can pivot or rotate until the rotating-stop lip 96*a* bottoms out against the retractable shroud 48*a* to prevent over-rotation of the pivotal locking member 58*a*.

Figure 32:
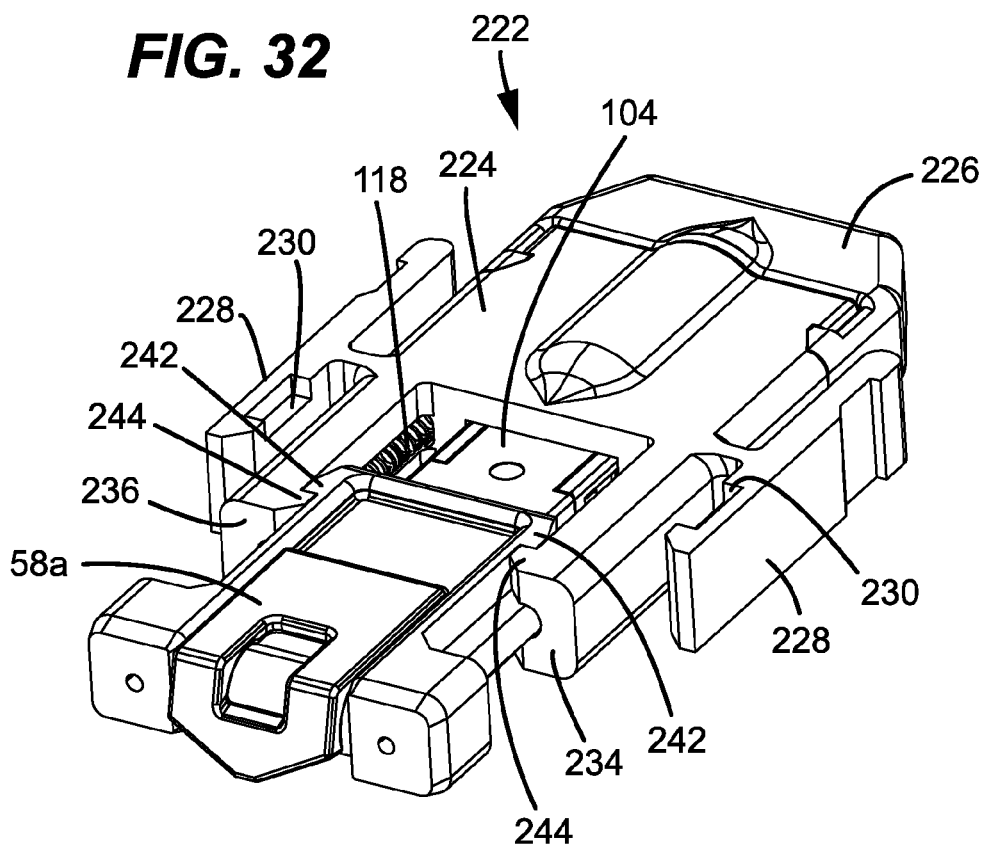
FIG. 32 illustrates a perspective view of a fiber optic connector with the pivotal locking member shown mounted to a front end of a retractable shroud, the pivotal locking member is depicted in a closed position and the retractable shroud is depicted in an extended position in accordance with the principles of the present disclosure.
Figure 33:
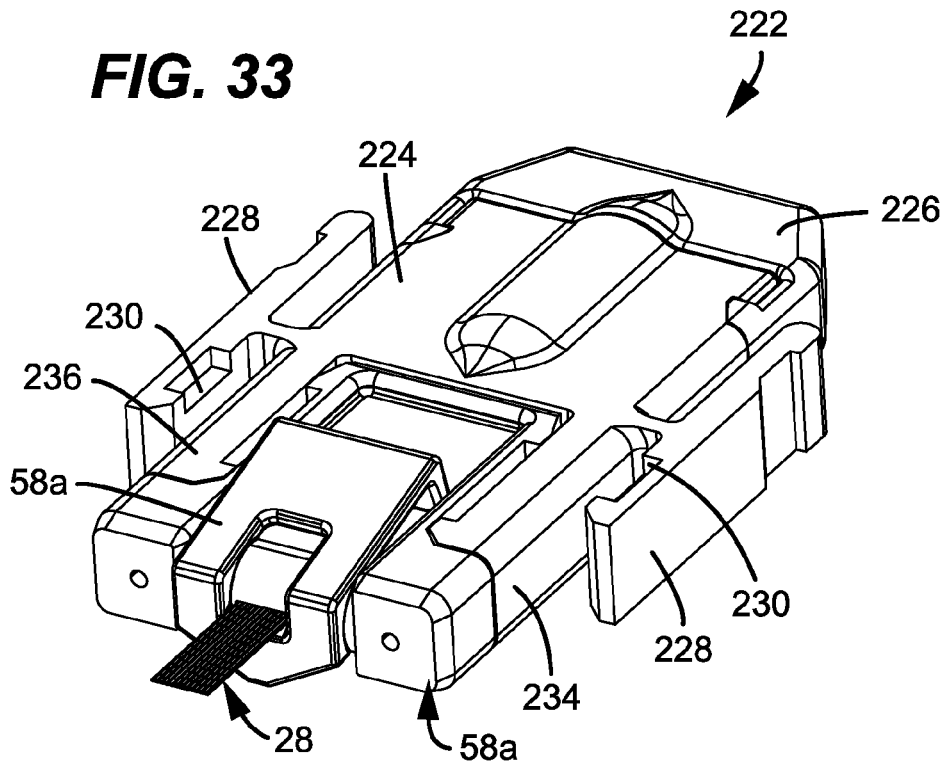
FIG. 33 illustrates a perspective view of the retractable shroud in a retracted position with the pivotal locking member pivoted to an open position.

Referring to FIGS. 32-33, the pivotal locking member 58*a* is shown with a multi-fiber fiber optic connector 222 in accordance with the principles of the present disclosure. The multi-fiber fiber optic connector 222 includes a connector body 224 and a rear piece connector body 226 that can be mounted to the connector body 224 by a snap-fit connection, although alternatives are possible.

Figure 34:
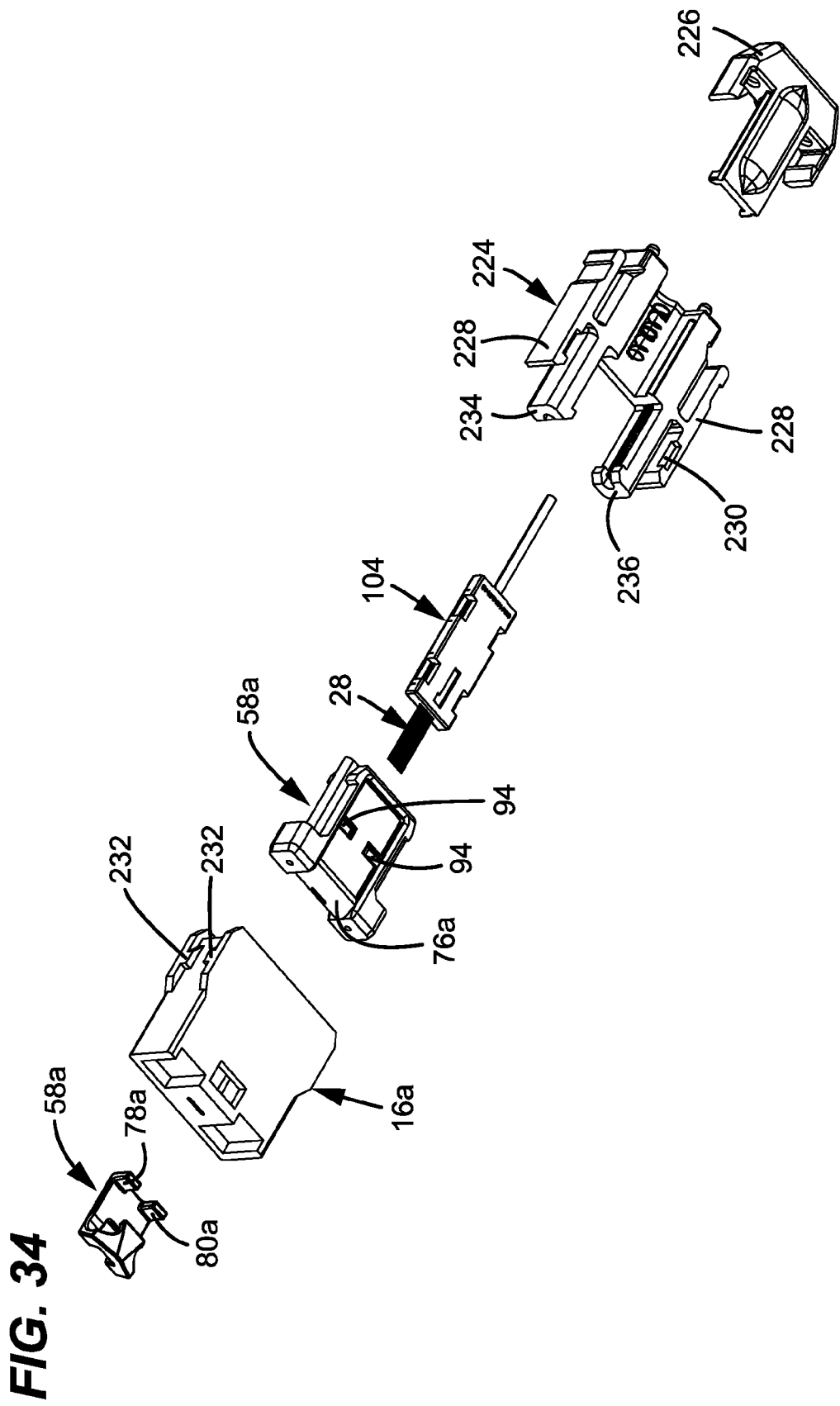
FIG. 34 illustrates an exploded, perspective view of the fiber optic connector of FIG. 32 including a partial multi-fiber adapter.

The multi-fiber fiber optic connectors 222 is similar to the first and second multi-fiber fiber optic connectors 12, 14 except for the connector body 224. The connector body 224 has first and second latches 228 that each define recesses 230 configured to engage fixed catches 232 (see FIG. 34) of a multi-fiber adapter 16*a* as part of a latching arrangement to allow the multi-fiber fiber optic connector 222 to be secured (e.g., interlocked) within a mating adapter port of the multi-fiber adapter 16*a*. The multi-fiber adapter 16*a* depicted is shown as a partial adapter.

The connector body 224 further includes a first front latch 234 and a second front latch 236 that each extend respectively from first and second minor sides 238, 240 of the connector body 224 for slidably mounting the retractable shroud 48*a* to the connector body 224. The retractable shroud 48*a* includes shroud catches 242 that engage connector catches 244 of the first and second front latches 234, 236 when in the extended position.

Turning to FIGS. 35-40, the pivotal locking member 58*a* is shown mounted to the retractable shroud 48*a*. The retractable shroud 48*a* and the pivotal locking member 58*a* functions similar to the retractable shroud 48 and pivotal locking member 58 described above. The multi-fiber adapter 16*a* causes the pivotal locking member 58*a* to pivot downward from the closed position (see FIG. 37) to the open position (see FIG. 40) such that the distal end face 68*a* of the shield member 66*a* is positioned flat with the groove-defining piece 138 of the multi-fiber adapter 16*a*. When the pivotal locking member 58*a* is in the open position, the fiber passages 142 of the retractable shroud 48*a* is aligned with the cutout 200 (see FIG. 43) of the pivotal locking member 58*a* and the multiple fiber alignment grooves 140 of the groove-defining piece 138. As the pivotal locking member 58*a* is pivoted to the open position, the first and second fingers 78*a*, 80*a* of the pivotal locking member 58*a* are raised out of the apertures 94 of the retractable shroud 48*a*. The pivotal locking member 58*a* can pivot or rotate until the rotating-stop lip 96*a* bottoms out against the retractable shroud 48*a* (see FIG. 43) to prevent over-rotation of the pivotal locking member 58*a*.

Figure 42:
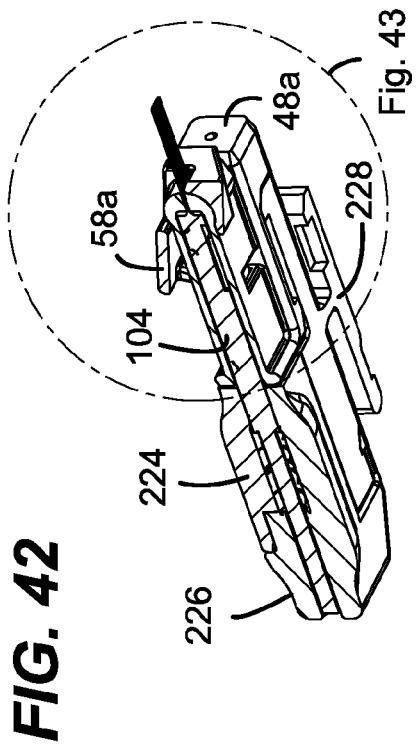
FIG. 42 illustrates a cross-sectional perspective view taken along line 42-42 of FIG. 41.
Figure 43:
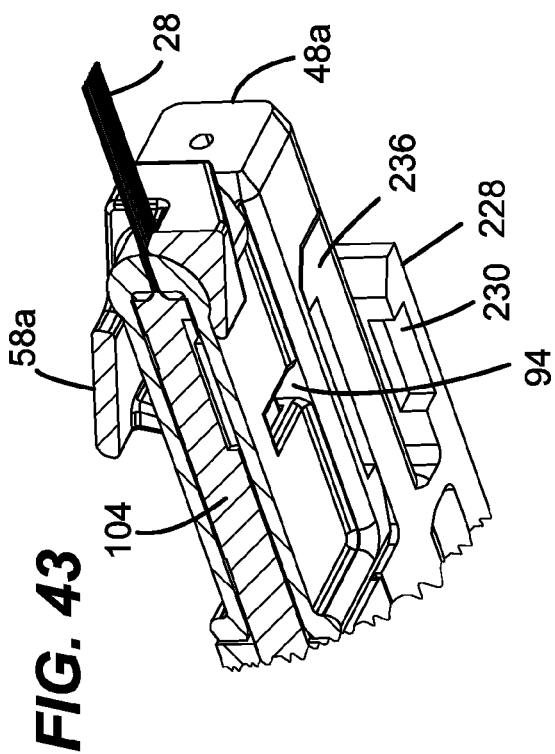
FIG. 43 illustrates an enlarged perspective view of a portion of the fiber optic connector of FIG. 42.
Figure 41:
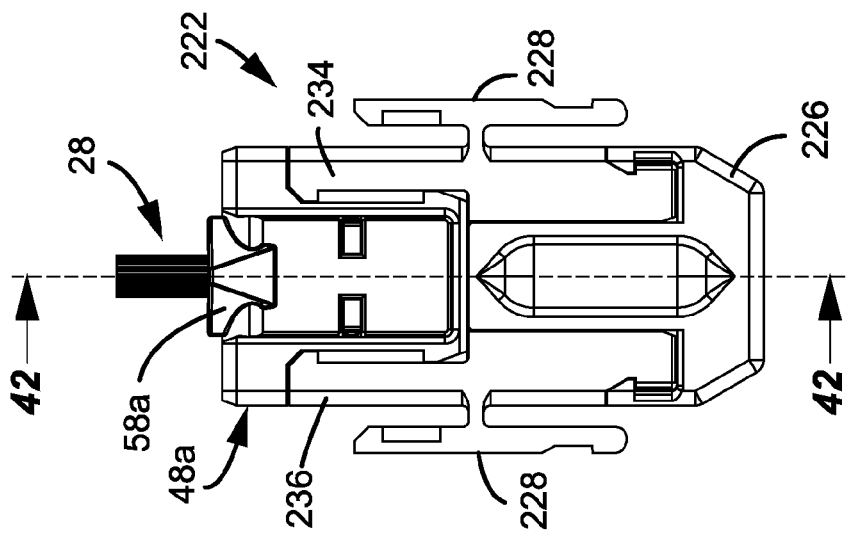
FIG. 41 illustrates a top view of the fiber optic connector of FIG. 33.

Turning to FIGS. 41-43, continued insertion of the multi-fiber fiber optic connector 222 into the mating adapter port causes the connector body 224 to move relative to the retractable shroud 48*a* which forces the fiber holder 104 forward such that the plurality of optical fibers 24*a*, 24*b* can slide through the fiber passages 142 of the retractable shroud 48*a* and through the cutout 200 of the pivotal locking member 58*a*. The fiber holder 104 is axially moveable relative to the connector body 224 and is preferably spring biased in a forward direction relative to the connector body 224. The fiber ends 28 can project from the plurality of fiber passages 142 of the retractable shroud 48*a* into the multiple fiber alignment grooves 140 of the groove-defining piece 138.

EXAMPLE ASPECTS OF THE DISCLOSURE

Aspect 1. A bare fiber connection system comprising:
first and second multi-fiber fiber optic connectors each including:
  a connector body having a front end and a rear end, the connector body defining a longitudinal axis that extends through the connector body in an orientation that extends from the front end to the rear end of the connector body;
  a plurality of optical fibers extending through the connector body from the rear end to the front end, the plurality of optical fibers having fiber ends accessible at the front end of the connector body;
  a retractable shroud mounted at the front end of the connector body, wherein the retractable shroud defines a plurality of fiber passages through which the plurality of optical fibers extend, the retractable shroud being movable along the longitudinal axis between an extended position where the fiber ends of the plurality of optical fibers are protected within the plurality of fiber passages and a retracted position where the fiber ends of the plurality of optical fibers project forwardly beyond the retractable shroud; and
  a pivotal locking member mounted at a distal end of the retractable shroud, wherein the pivotal locking member is configured to pivot between a closed position in which the retractable shroud is locked in the extended position and an open position in which the retractable shroud is unlocked to be movable to the retracted position, the pivotal locking member defining an opening through which the fiber ends of the plurality of optical fibers extend therethrough when the pivotal locking member is in the open position; and
a multi-fiber adapter defining first and second mating adapter ports for respectively receiving the first and second multi-fiber fiber optic connectors to couple the first and second multi-fiber fiber optic connectors together.

Aspect 2. The bare fiber connection system of aspect 1, wherein when the first and second multi-fiber fiber optic connectors are inserted into the first and second mating adapter ports, the pivotal locking member engages a shoulder of the multi-fiber adapter to cause the pivotal locking member to pivot about a pivot point from the closed position to the open position.

Aspect 3. The bare fiber connection system of aspect 1, wherein the pivotal locking member includes a main body and fingers that extend perpendicular to the main body, the retractable shroud defining apertures for receiving the fingers when the pivotal locking member is in the closed position.

Aspect 4. The bare fiber connection system of aspect 1, wherein when the fingers are positioned within the apertures of the retractable shroud, the retractable shroud is locked relative to the connector body.

Aspect 5. The bare fiber connection system of aspect 1, wherein the multi-fiber adapter includes multiple fiber alignment grooves for receiving and co-axially aligning the fiber ends of the plurality of optical fibers such that optical signals can be conveyed between the plurality of optical fibers of the first and second multi-fiber fiber optic connectors.

Aspect 6. The bare fiber connection system of aspect 1, further comprising first and second outboard springs for biasing the retractable shroud toward the extended position.

Aspect 7. The bare fiber connection system of aspect 6, wherein the connector bodies each includes first and second front latches for securing the retractable shroud to the connector body, the first and second front latches each defining a spring receiving groove for receiving the first and second outboard springs.

Aspect 8. The bare fiber connection system of aspect 1, wherein first and second minor sides of the connector bodies include catches for engaging latches of the multi-fiber adapter when the connector bodies are mounted in respective first and second mating adapter ports of the multi-fiber adapter.

Aspect 9. The bare fiber connection system of aspect 1, wherein the pivotal locking member has a C-shaped seat for matching a spherical body portion of the retractable shroud.

Aspect 10. The bare fiber connection system of aspect 1, wherein the pivotal locking member includes a rotating-stop lip to prevent over-rotation of the pivoting locking member on the retractable shroud.

Aspect 11. The bare fiber connection system of aspect 1, further comprising a rear connector body that is mounted to the connector bodies by a snap-fit connection.

Aspect 12. The bare fiber connection system of aspect 1, further comprising a fiber holder mounted within the connector bodies, wherein the plurality of optical fibers are anchored to the fiber holder.

Aspect 13. A pivotal locking member for use with a bare fiber connector, the pivotal locking member being mounted to a front end of a retractable shroud of the bare fiber connector, the retractable shroud being movable between an extended position and a retracted position, the pivotal locking member comprising:
 a main body that extends between a first end and an opposite second end;
 a shield member that extends in a direction perpendicular to the main body at the first end; and
 first and second fingers that extend in a direction perpendicular to the main body at the second end thereof, the first finger being positioned at a first side of the main body and the second fiber being positioned at a second side of the main body, wherein the first and second fingers are parallel to the shield member.

Aspect 14. The pivotal locking member of aspect 13, wherein the shield member has a distal end face that defines a longitudinal slot.

Aspect 15. The pivotal locking member of aspect 13, wherein the shield member defines a cutout in the shield member and the main body.

Aspect 16. The pivotal locking member of aspect 13, wherein the pivotal locking member defines a C-shaped seat for clamping over a spherical body portion of the retractable shroud.

Aspect 17. The pivotal locking member of aspect 13, wherein the retractable shroud defines apertures for receiving the first and second fingers of the pivotal locking member.

Aspect 18. The pivotal locking member of aspect 17, wherein when the first and second fingers are positioned within the apertures of the retractable shroud, the retractable shroud is locked relative to the bare fiber connector body.

Aspect 19. The pivotal locking member of aspect 14, wherein the pivotal locking member is configured to pivot between a closed position in which the retractable shroud is locked in the extended position and an open position in which the retractable shroud is unlocked to be movable to the retracted position, and wherein fiber ends of a plurality of optical fibers of the bare fiber connector extend through the longitudinal slot when the pivotal locking member is in the open position.

Aspect 20. A fiber optic connector comprising:
 a connector body having a front end and a rear end, the connector body defining a longitudinal axis that extends through the connector body in an orientation that extends from the front end to the rear end of the connector body;
 a plurality of optical fibers extending through the connector body from the rear end to the front end, the plurality of optical fibers having fiber ends accessible at the front end of the connector body;
 a retractable shroud mounted at the front end of the connector body, wherein the retractable shroud defines a plurality of fiber passages through which the plurality of optical fibers extend, the retractable shroud being movable along the longitudinal axis between an extended position where the fiber ends of the plurality of optical fibers are protected within the plurality of fiber passages and a retracted position where the fiber ends of the plurality of optical fibers project forwardly beyond the retractable shroud; and
 a pivotal locking member mounted at a distal end of the retractable shroud, wherein the pivotal locking member is configured to pivot between a closed position in which the retractable shroud is locked in the extended position and an open position in which the retractable shroud is unlocked to be movable to the retracted position, the pivotal locking member having at least one opening through which the plurality of optical fibers extend when the pivotal locking member is in the open position and the retractable shroud is in the retracted position.

From the forgoing detailed description, it will be evident that modifications and variations can be made without departing from the spirit and scope of the disclosure.

What is claimed is:
1. A bare fiber connection system comprising:
 first and second multi-fiber fiber optic connectors each including:
  a connector body having a front end and a rear end, the connector body defining a longitudinal axis that extends through the connector body in an orientation that extends from the front end to the rear end of the connector body;
  a plurality of optical fibers extending through the connector body from the rear end to the front end, the plurality of optical fibers having fiber ends accessible at the front end of the connector body;

a retractable shroud mounted at the front end of the connector body, wherein the retractable shroud defines a plurality of fiber passages through which the plurality of optical fibers extend, the retractable shroud being movable along the longitudinal axis between an extended position where the fiber ends of the plurality of optical fibers are protected within the plurality of fiber passages and a retracted position where the fiber ends of the plurality of optical fibers project forwardly beyond the retractable shroud; and a pivotal locking member mounted at a distal end of the retractable shroud, wherein the pivotal locking member is configured to pivot between a closed position in which the retractable shroud is locked in the extended position and an open position in which the retractable shroud is unlocked to be movable to the retracted position, the pivotal locking member defining an opening through which the fiber ends of the plurality of optical fibers extend when the pivotal locking member is in the open position, the pivotal locking member further defining a seat which receives a body portion of the retractable shroud to form a pivot point about which the pivotal locking member pivots; and a multi-fiber adapter defining first and second mating adapter ports for respectively receiving the first and second multi-fiber fiber optic connectors to couple the first and second multi-fiber fiber optic connectors together.

2. The bare fiber connection system of claim 1, wherein when the first and second multi-fiber fiber optic connectors are inserted into the first and second mating adapter ports, the pivotal locking member engages a shoulder of the multi-fiber adapter to cause the pivotal locking member to pivot about a pivot point from the closed position to the open position.

3. The bare fiber connection system of claim 1, wherein the pivotal locking member includes a main body and fingers that extend perpendicular to the main body, the retractable shroud defining apertures for receiving the fingers when the pivotal locking member is in the closed position.

4. The bare fiber connection system of claim 3, wherein when the fingers are positioned within the apertures of the retractable shroud, the retractable shroud is locked relative to the connector body.

5. The bare fiber connection system of claim 1, wherein the multi-fiber adapter includes multiple fiber alignment grooves for receiving and co-axially aligning the fiber ends of the plurality of optical fibers such that optical signals can be conveyed between the plurality of optical fibers of the first and second multi-fiber fiber optic connectors.

6. The bare fiber connection system of claim 1, further comprising first and second outboard springs for biasing the retractable shroud toward the extended position.

7. The bare fiber connection system of claim 6, wherein the connector bodies each include first and second front latches for securing the retractable shroud to the connector body, the first and second front latches each defining a spring receiving groove for receiving the first and second outboard springs.

8. The bare fiber connection system of claim 1, wherein first and second minor sides of the connector bodies include catches for engaging latches of the multi-fiber adapter when the connector bodies are mounted in respective first and second mating adapter ports of the multi-fiber adapter.

9. The bare fiber connection system of claim 1, wherein the pivotal locking member has a C-shaped seat for matching a spherical body portion of the retractable shroud.

10. The bare fiber connection system of claim 1, wherein the pivotal locking member includes a rotating-stop lip to prevent over-rotation of the pivoting locking member on the retractable shroud.

11. The bare fiber connection system of claim 1, further comprising a rear connector body that is mounted to the connector bodies by a snap-fit connection.

12. The bare fiber connection system of claim 1, further comprising a fiber holder mounted within the connector bodies, wherein the plurality of optical fibers are anchored to the fiber holder.

13. A pivotal locking member for use with a bare fiber connector, the pivotal locking member being mounted to a front end of a retractable shroud of the bare fiber connector, the retractable shroud being movable between an extended position and a retracted position, the pivotal locking member comprising:

a main body that extends between a first end and an opposite second end;

a shield member that extends in a direction perpendicular to the main body at the first end;

a seat formed by the main body and the shield member, wherein a body portion of the retractable shroud is mounted in the seat to form a pivot point about which the pivotal locking member pivots; and first and second fingers that extend in a direction perpendicular to the main body at the second end thereof, the first finger being positioned at a first side of the main body and the second finger being positioned at a second side of the main body, wherein the first and second fingers are parallel to the shield member.

14. The pivotal locking member of claim 13, wherein the shield member has a distal end face that defines a longitudinal slot.

15. The pivotal locking member of claim 13, wherein the shield member defines a cutout in the shield member and the main body.

16. The pivotal locking member of claim 13, wherein the pivotal locking member defines a C-shaped seat for clamping over a spherical body portion of the retractable shroud.

17. The pivotal locking member of claim 13, wherein the retractable shroud defines apertures for receiving the first and second fingers of the pivotal locking member.

18. The pivotal locking member of claim 17, wherein when the first and second fingers are positioned within the apertures of the retractable shroud, the retractable shroud is locked relative to the bare fiber connector body.

19. The pivotal locking member of claim 14, wherein the pivotal locking member is configured to pivot between a closed position in which the retractable shroud is locked in the extended position and an open position in which the retractable shroud is unlocked to be movable to the retracted position, and wherein fiber ends of a plurality of optical fibers of the bare fiber connector extend through the longitudinal slot when the pivotal locking member is in the open position.

20. A fiber optic connector comprising:

a connector body having a front end and a rear end, the connector body defining a longitudinal axis that extends through the connector body in an orientation that extends from the front end to the rear end of the connector body;

a plurality of optical fibers extending through the connector body from the rear end to the front end, the plurality of optical fibers having fiber ends accessible at the front end of the connector body;

a retractable shroud mounted at the front end of the connector body, wherein the retractable shroud defines a plurality of fiber passages through which the plurality of optical fibers extend, the retractable shroud being movable along the longitudinal axis between an extended position where the fiber ends of the plurality of optical fibers are protected within the plurality of fiber passages and a retracted position where the fiber ends of the plurality of optical fibers project forwardly beyond the retractable shroud; and a pivotal locking member mounted at a distal end of the retractable shroud, wherein the pivotal locking member is configured to pivot between a closed position in which the retractable shroud is locked in the extended position and an open position in which the retractable shroud is unlocked to be movable to the retracted position, the pivotal locking member having at least one opening through which the plurality of optical fibers extend when the pivotal locking member is in the open position and the retractable shroud is in the retracted position, the pivotal locking member defining a seat which receives a body portion of the retractable shroud to form a pivot point about which the pivotal locking member pivots.

* * * * *